US010055710B2

(12) United States Patent
Sheth et al.

(10) Patent No.: US 10,055,710 B2
(45) Date of Patent: Aug. 21, 2018

(54) INFORMATION MANAGEMENT SYSTEM FOR PRODUCT INGREDIENTS

(71) Applicant: Label Insight, Chicago, IL (US)

(72) Inventors: Ronak Sheth, Chicago, IL (US); Anton Xavier, Chicago, IL (US); Dagan Xavier, Chicago, IL (US); Dheeraj Patri, Chicago, IL (US); Tyler Trollinger, Chicago, IL (US); Harrison Nguyen, Chicago, IL (US); John Castaldo, Chicago, IL (US); Jeffrey Williams, Chicago, IL (US)

(73) Assignee: Label Insight, Inc., Chicago, IL (US)

( * ) Notice: Subject to any disclaimer, the term of this patent is extended or adjusted under 35 U.S.C. 154(b) by 0 days.

(21) Appl. No.: 15/466,091

(22) Filed: Mar. 22, 2017

(65) Prior Publication Data

US 2018/0046972 A1 Feb. 15, 2018

Related U.S. Application Data

(60) Provisional application No. 62/468,408, filed on Mar. 8, 2017, provisional application No. 62/372,958, filed on Aug. 10, 2016.

(51) Int. Cl.
*G06F 19/00* (2018.01)
*G06Q 10/08* (2012.01)
(Continued)

(52) U.S. Cl.
CPC ....... *G06Q 10/087* (2013.01); *G06K 7/10861* (2013.01); *G06K 7/10881* (2013.01); *G06K 7/1417* (2013.01); *G06K 19/06037* (2013.01)

(58) Field of Classification Search
CPC ............. G06K 7/1417; G06K 7/10881; G06K 7/10861; G06K 19/06037; G06Q 10/087
(Continued)

(56) References Cited

U.S. PATENT DOCUMENTS 9,721,446 B1 * 8/2017 Hanis ..................... G08B 21/18
2006/0122468 A1 6/2006 Tavor et al.
(Continued)

FOREIGN PATENT DOCUMENTS

WO WO2008/031163 A1 3/2008

OTHER PUBLICATIONS

International Search Report & Written Opinion in related PCT App No. PCT/US2017/046348, dated Nov. 2, 2017.

*Primary Examiner* — Claude J Brown
(74) *Attorney, Agent, or Firm* — Polsinelli PC

(57) ABSTRACT

A method for automatically deconstructing, analyzing, and confirming information on a plurality of labels using information technology. The plurality of labels is for a plurality of consumer products. The method includes obtaining, using a computing device, a plurality of labels from the plurality of consumer products, each label of the plurality of labels identifying content of a respective consumer product of the plurality of consumer products. The method includes processing, using the computing device, a label of the plurality of labels to identify constituent information on the label including a first set of claims on the label. The method also includes generating a portion of a label view for display at a client device based on a query about at least the respective consumer product associated with the label, including automatically displaying a second set of claims having at least one claim based on the constituent information that is different than any claim in the first set of claims.

20 Claims, 8 Drawing Sheets

(51) Int. Cl.
*G06K 7/10* (2006.01)
*G06K 19/06* (2006.01)
*G06K 7/14* (2006.01)

(58) Field of Classification Search
USPC .......................................................... 235/385
See application file for complete search history.

(56) References Cited

U.S. PATENT DOCUMENTS

| | | | |
|---|---|---|---|
| 2009/0187583 A1* | 7/2009 | Pape | G06Q 10/08 |
| 2012/0005222 A1 | 1/2012 | Bhagwan | |
| 2013/0105565 A1* | 5/2013 | Kamprath | G06F 19/3475 |
| | | | 235/375 |
| 2013/0295532 A1* | 11/2013 | Minvielle | G09B 19/0092 |
| | | | 434/127 |
| 2014/0156412 A1* | 6/2014 | Tse | G06K 9/00671 |
| | | | 705/14.58 |
| 2014/0214547 A1* | 7/2014 | Signorelli | G06Q 30/0267 |
| | | | 705/14.64 |
| 2014/0322678 A1* | 10/2014 | Briancon | G09B 19/0092 |
| | | | 434/127 |
| 2015/0100516 A1* | 4/2015 | Hicks | G06Q 30/0282 |
| | | | 705/347 |
| 2016/0104225 A1* | 4/2016 | Stillman | G06Q 30/0623 |
| | | | 705/26.61 |
| 2016/0307246 A1* | 10/2016 | Porubcan | G06Q 30/0609 |
| 2017/0039885 A1* | 2/2017 | Flores | G09B 19/0092 |
| 2017/0237899 A1* | 8/2017 | Wexler | H04N 5/23222 |
| | | | 348/207.11 |

* cited by examiner

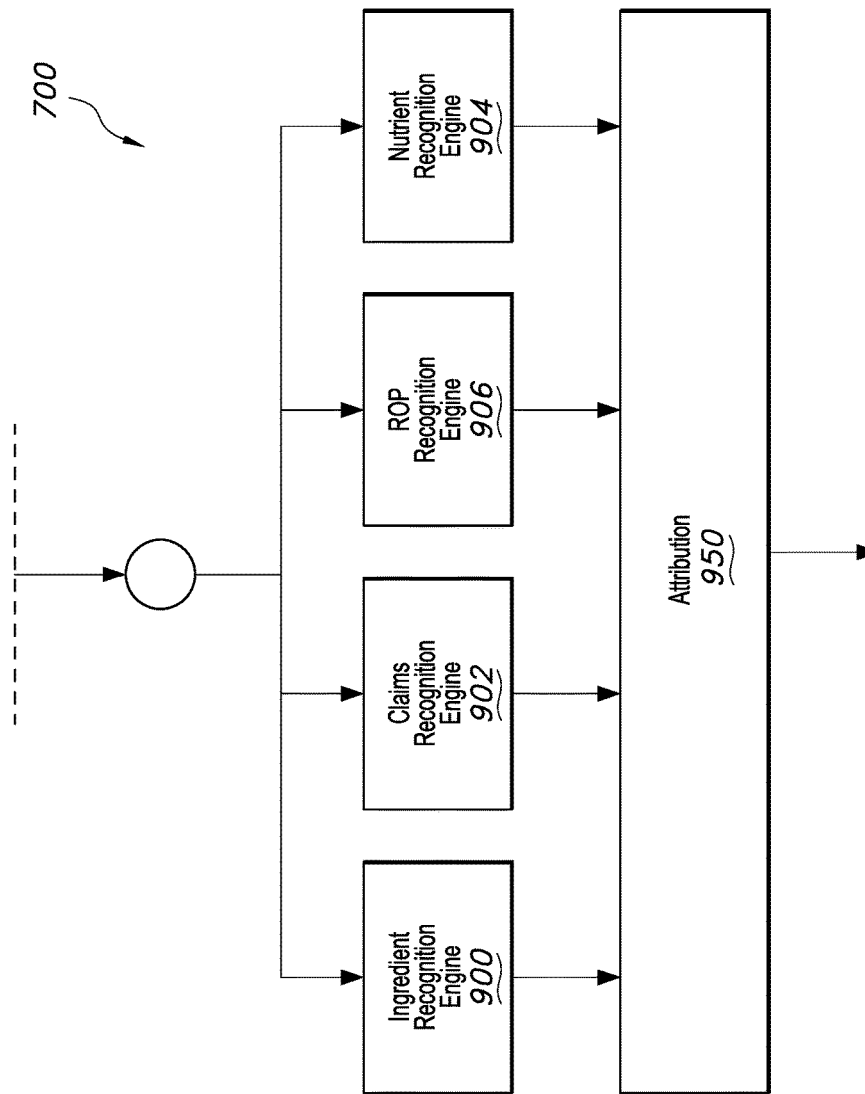

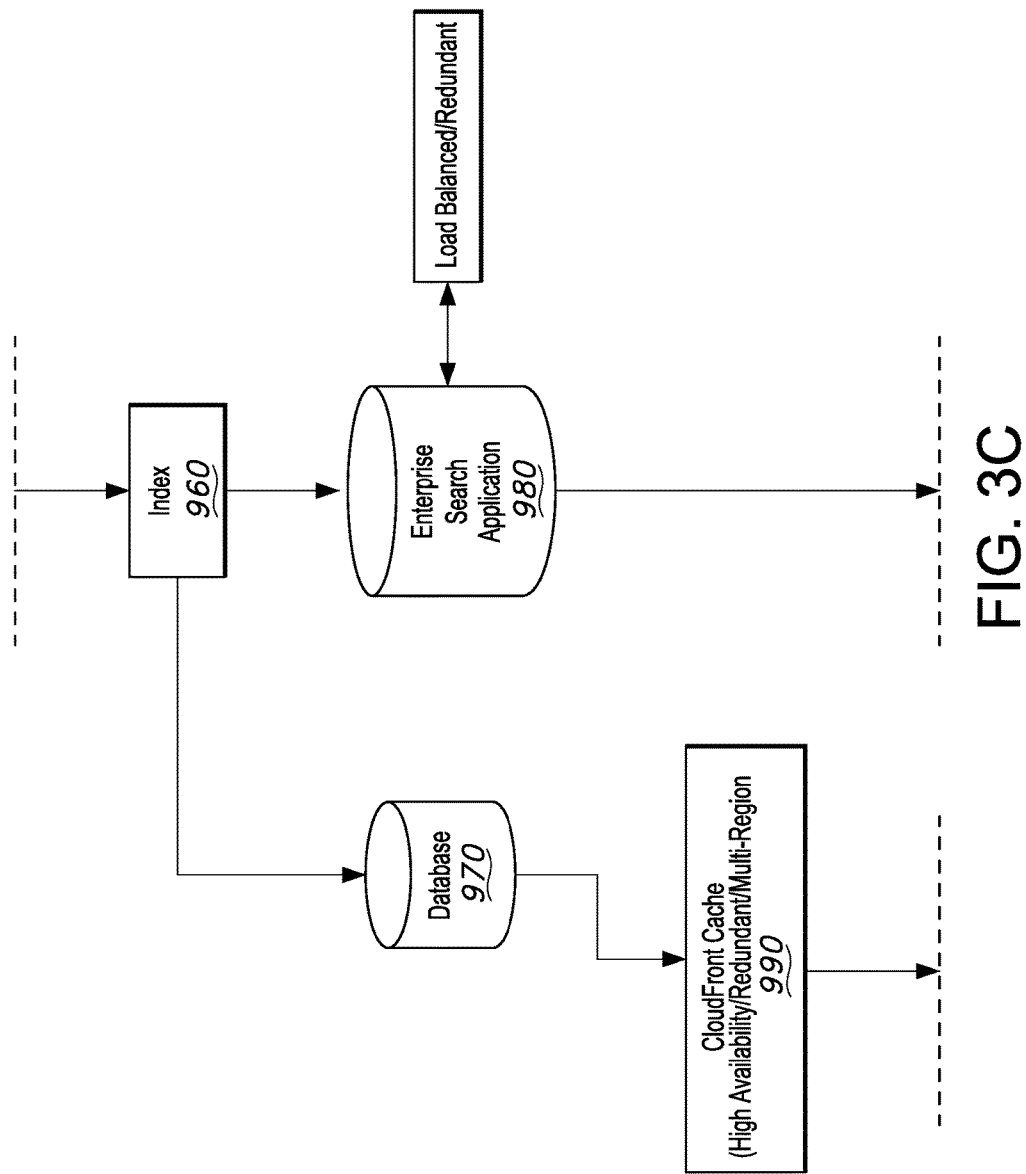

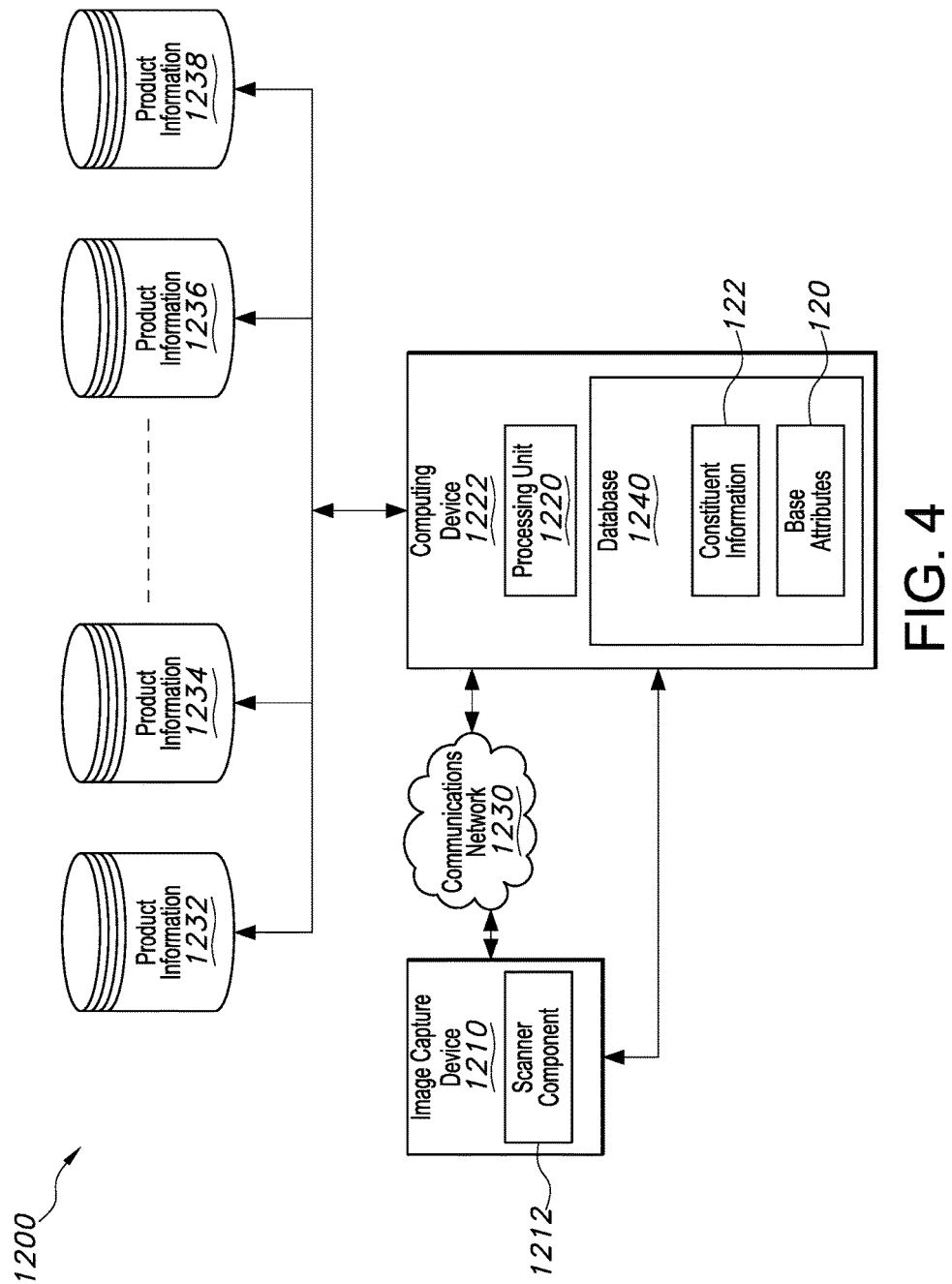

INFORMATION MANAGEMENT SYSTEM FOR PRODUCT INGREDIENTS

CROSS-REFERENCE TO RELATED APPLICATIONS

The present application claims the benefit of the following applications: U.S. Provisional Application No. 62/372,958, filed Aug. 10, 2016, and entitled "Information Management System for Product Ingredients; and U.S. Provisional Application No. 62/468,408, filed Mar. 8, 2017, and entitled "Information Management System for Product Ingredients." The above-captioned applications are hereby incorporated by reference as if set forth herein in their entirety.

FIELD

The present disclosure relates to an information management computing system and related network computing systems for automatically capturing, analyzing, and manipulating product information, such as for food products, including an omnibus ingredient detection system that automatically detects and deconstructs information typically displayed on the labels of products.

BACKGROUND

A typical food package contains various information, including information about amounts of various ingredients and other information, such as marketing claims, certification information, and the like. However, ingredient text on the packaging can be long and highly complex, and many different words can be used to identify the same ingredient or set of ingredients. Ingredients contained in lists are quite frequently nearly incomprehensible to an average consumer, and ingredient lists, marketing claims, and other text can also include confusing statements such as and/or statements, compound and parenthetical listings, and even somewhat opaque terms like "contains natural flavors." The product packaging includes many other graphics and text that can be more helpful or more confusing to the consumer. Moreover, the product packaging and labeling can vary greatly between manufacturers and retailers, resulting in differing label formats and ingredient information that can make it difficult to compare across the products from different manufacturers. Ingredients are also difficult to manage for manufacturers themselves, who may not understand what statements they can make that comply with regulatory requirements, requirements of certification, and advertising regulations. As a result of the complexity and obscurity of ingredient information, manufacturers and retailers may not fully understand competitive products, so it can be difficult to understand how products should be positioned relative to third party products. Regulators may also find it difficult to confirm compliance. Accordingly, the inventors have recognized a need for improved systems and technology for managing ingredient information.

BRIEF DESCRIPTION OF THE DRAWINGS

The many aspects of the present disclosure and how they may be implemented in practice are described below by way of non-limiting examples and with reference to the accompanying drawings.

FIGS. 3A, 3B, 3C and 3D are partial diagrams that form together an exemplary ingredient data management platform and computing environment of the ingredient detection system that receives information from the label of the product in accordance with the present disclosure.

FIG. 4 is a diagram of an exemplary image capturing computing system in accordance with the present disclosure.

SUMMARY

Figure 1:
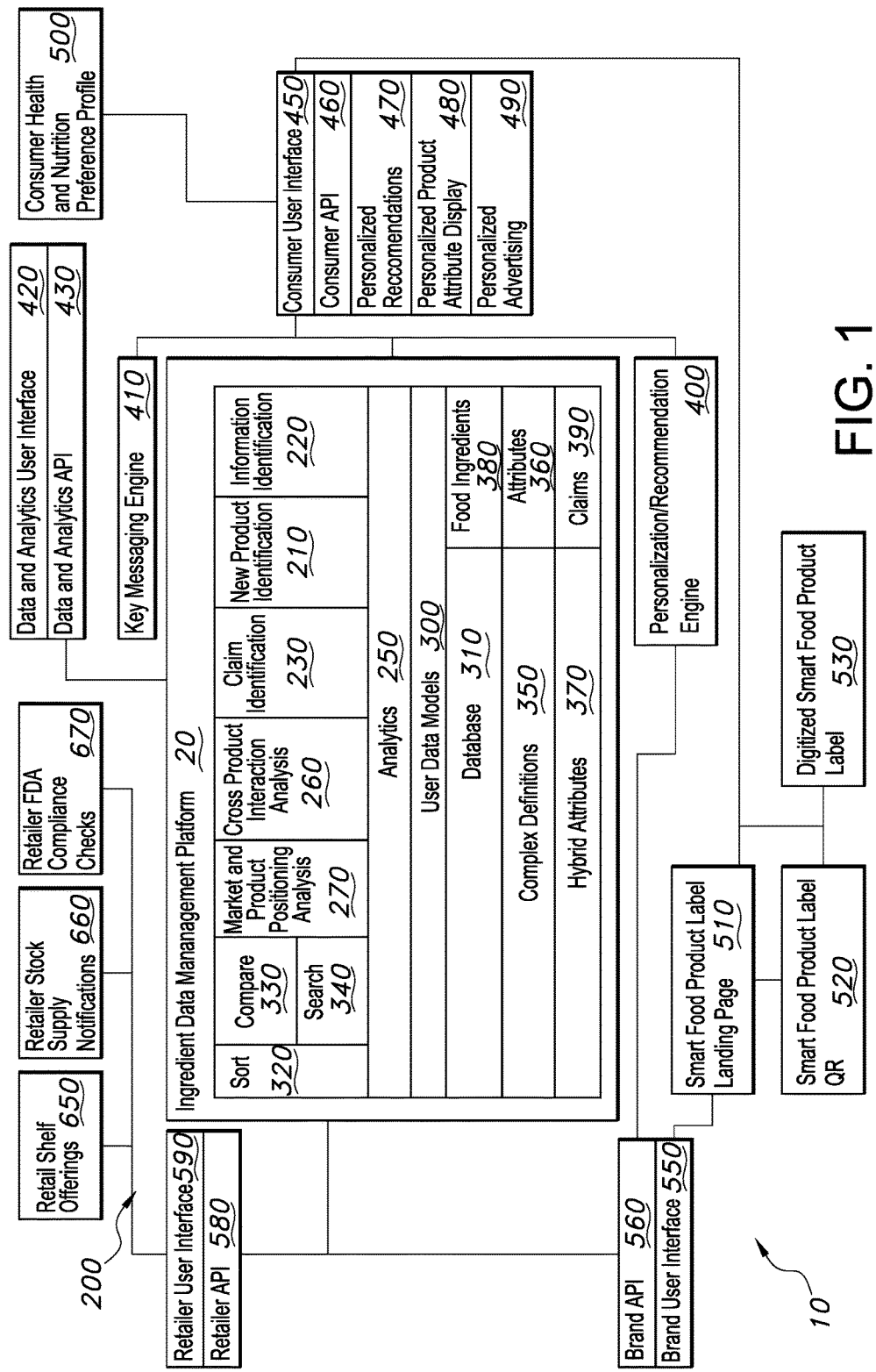
FIG. 1 is a diagram of an ingredient detection system having an ingredient data management platform including a technology stack in accordance with various aspects of the present disclosure.

The many aspects of the present disclosure include a method for deconstructing information from a plurality of labels using information technology. The plurality of labels is for a plurality of consumer products available to users. The method includes obtaining, using a computing device, a plurality of labels from the plurality of consumer products. Each label of the plurality of labels identifies the content of a respective consumer product of the plurality of consumer products. The method includes processing, using the computing device, a label of the plurality of labels to identify a first piece of constituent information corresponding to a first portion of the label and a second piece of constituent information corresponding to a second portion of the label that is different than the first portion of the label. The method includes assigning, using the computing device, a first base attribute to the first piece of the constituent information and assigning, using the computing device, a second base attribute to the second piece of the constituent information. The first base attribute is descriptive of the first piece of the constituent information and is different than the second base attribute that is descriptive of the second piece of the constituent information. The method includes associating, using the computing device, a first master attribute with at least one of the first base attribute and generating for display at a client device, a portion of a label view based on a query about at least one consumer product of the plurality of consumer products, the portion of the label view containing detail of the master attribute.

In the many aspects of the present disclosure, the first and second piece of constituent information are each at least one of text and graphics from a portion of each label in the plurality of label. The portion of each of the labels in the plurality of label is at least one of nutrition facts, ingredient listings, certification listings, recycling information, warning listings, certification statements, universal product codes, manufacturers' information, marketing claim information, and package size.

In the many aspects of the present disclosure, the processing, using the computing device, of the label of the plurality of labels to identify the first piece of constituent information corresponding to the first portion of the label includes routing the first portion of each of the labels automatically to an automatic recognition and comparison process for confirmation of a match between the first base attribute and the first piece of the constituent information on each of the labels.

In the many aspects of the present disclosure, the obtaining, using a computing device, of the plurality of labels from the plurality of consumer products includes capturing each of the labels of the plurality of labels at a scanning device and transmitting the plurality of labels to the computing device.

In the many aspects of the present disclosure, one of the consumer products for which the portion of the label view is generated by the computing device in response to the query is related to at least one item that is selected from a group consisting of at least one of foods; beverages; consumer packaged goods; personal items; pet care products; clothing; toys for children; lawn care products; window stickers for vehicles; heating, ventilation, air conditioning products; and bedding products.

In the many aspects of the present disclosure, the foods are selected from a group consisting of at least one of canned goods, produce, meats, dairy products, and snacks. The beverages are selected from a group consisting of at least one of bottled water, fruit juice, vegetable juice, protein shakes, nutritional shakes, pre-packaged coffee, pre-packaged tea, soda pop, carbonated juices; wines, liquor, beer, mixers, and energy drinks. The personal items are selected from a group consisting of at least one of deodorants, toothpastes, mouthwashes, vitamins, herbal supplements wound dressings, cosmetics, skin moisturizers, sun blocks, anti-itch creams, and sunburn creams. The pet care products are selected from a group consisting of at least one of domestic animal foods, treats, litter box materials, topical dressings, and specialized diet mixes. The clothing is selected from a group consisting of at least one of undershirts, undergarments, pants, shoes, coats, information about material from which the clothing is made, coatings on the clothing, and treatments on the clothing. The toys for children are selected from a group consisting of at least one of mobiles, teething instruments, baby bottles, toys that can fit into a mouth of a child, and pacifiers. The lawn care products are selected from a group consisting of at least one of fertilizers, pesticides, and moisture retentive media. The window stickers for vehicles are selected from a group consisting of at least one of automobiles, commercial vehicles, off-road vehicles, motorcycles, all-terrain vehicles, lawn-mowing equipment, and snow removal equipment. The heating, ventilation, and air conditioning products are selected from a group consisting of at least one of air conditioning handlers, furnaces, humidifiers, de-humidifiers, swamp-coolers, attic fans, media air cleaners, and electrostatic air cleaners. The bedding products are selected from a group consisting of at least one of mattresses, box springs, mattress covers, sheets, comforters, duvets, pillows, pillow cases, dust covers, and blankets.

In the many aspects of the present disclosure, the user is a consumer accessing the computing device with a mobile device through which the user is able to identify at least one of the consumer products to obtain the portion of the label view containing the master attribute descriptive of at least one of the consumer products.

In the many aspects of the present disclosure, the portion of the label view is configured to provide information related to a SmartLabel® brand label. In the many aspects of the present disclosure, the mobile device of one of the users is configured to receive QR code data and to present the portion of the label view that pertains to the at least one of the consumer products that is associated with the QR code data. In the many aspects of the present disclosure, the mobile device is selected from a group consisting of at least one of a smartphone, a handheld scanner, a kiosk by the consumer, a wearable, and a computer.

In the many aspects of the present disclosure, the label view is configured to detail other consumer products with which the master attribute is also associated. In the many aspects of the present disclosure, the portion of the label view that contains detail of the master attribute is also configured to display serving size information. The serving size information is selected from a group consisting of at least one of a reference amount customarily consumed, a user-adjustable weight per serving, 100 grams of weight per serving, and a recommended daily allowance.

In the many aspects of the present disclosure, the portion of the label view that contains detail of the master attribute is also configured to display at least one food code recognized by the National Health and Nutrition Examination Survey. The food code is related to the at least one of the consumer products on which the portion of the label view is based.

In the many aspects of the present disclosure, one of the users is a brand owner accessing the computing device with a brand owner interface through which the brand owner is able to identify the at least one of the consumer products to obtain the portion of the label view containing the master attribute descriptive of the at least one of the consumer products. The brand owner interface is configured to permit the brand owners to input corrective information to be applied to the portion of the label view for the one of the consumer products.

In the many aspects of the present disclosure, the brand owner interface is configured to include all of the base attributes associated with each of the many pieces of the constituent information for one of the consumer products. The computing device is configured to provide the brand user interface with at least one of a confirmation of a legitimacy of the at least one claim, a suggestion for at least one additional claim, and a suggestion for removal of the at least one claim.

In the many aspects of the present disclosure, a method for deconstructing information from a plurality of labels into constituent information using information technology with the plurality of labels being on products for consumers includes obtaining the plurality of the labels from the consumer products into an ingredient data management platform. The method includes detecting automatically with the ingredient data management platform each piece among a plurality of pieces of constituent information from each label in the plurality of labels and assigning at least a first base attribute automatically with the ingredient data management platform to a first piece of the constituent information and to all other pieces of the constituent information that match the first base attribute of the first piece of the constituent information. The method includes assigning at least a second base attribute automatically with the ingredient data management platform to a second piece of the constituent information and to all other pieces of the constituent information that match the second base attribute of the second piece of the constituent information. Each of the first base attribute and the first piece of the constituent information are different from the second base attribute and the second piece of the constituent information. The method includes associating a master attribute automatically with the ingredient data management platform to both the first base attribute and the second base attribute and generating a portion of a label view in response to a query about at least one of the consumer products. The portion of the label view containing detail of at least the master attribute includes information that is otherwise unavailable in the pieces of constituent information of the one of the consumer products to which the label view refers.

In the many aspects of the present disclosure, the portion of the label view that contains detail of the master attribute is also configured to display serving size information. The serving size information is selected from a group consisting of at least one of a reference amount customarily consumed, a user-adjustable weight per serving, 100 grams of weight per serving, and a recommended daily allowance.

In the many aspects of the present disclosure, the ingredient data management platform is configured to be accessed by one of the consumers with a mobile device through which one of the consumers is able to identify one of the consumer products to obtain the portion of the label view. The mobile device is selected from a group consisting of at least one of a smartphone, a handheld scanner, a kiosk by the consumer, a wearable, and a computer.

In the many aspects of the present disclosure, the mobile device of one of the consumers is configured to receive QR code data. The label view pertains to one of the consumer products that is associated with the QR code. The mobile device is one of a smartphone, a handheld scanner, a kiosk by the consumer, a wearable, and a computer.

In the many aspects of the present disclosure, detecting automatically with the ingredient data management platform includes capturing each of the labels of the plurality of labels at a scanning device and transmitting the plurality of labels to the ingredient data management platform.

In the many aspects of the present disclosure, a method for parsing information from a plurality of product labels using information technology includes obtaining constituent information with an ingredient data platform from text and graphics found on a portion of a label from a plurality of the product labels. The method includes assigning base attributes automatically with the ingredient data platform to each piece of the constituent information on at least one of the product labels and associating the base attributes assigned by the ingredient data platform with different base attributes in at least one pre-constructed taxonomy data structure handled by the ingredient data platform to establish relationships between the base attributes that were previously assigned to the ingredient data platform and the base attributes from the pre-constructed taxonomy data structure.

The method includes assigning a master attribute automatically with the ingredient data platform to a relationship between the base attributes assigned by the ingredient data platform and the associated base attributes in the pre-constructed taxonomy data structure. The method includes generating at least a portion of a label view containing detail based on the master attribute pertaining to at least one consumer product whose product label lacks information detailed in the portion of the label view.

In the many aspects of the present disclosure, the portion of each product label includes items of constituent information that are at least one of nutrition facts, ingredient listings, certification listings, recycling information, warning listings, certification statements, universal product codes, manufacturers' information, marketing claims and package size.

In the many aspects of the present disclosure, the at least one consumer product for which the portion of the label view is generated by the ingredient data platform is related to one item selected from a group consisting of foods; beverages; consumer packaged goods; personal items; pet care products; clothing; toys for children; lawn care products; window stickers for vehicles; heating, ventilation, air conditioning products; and bedding products. In the many aspects of the present disclosure, the at least one consumer product is foods selected from a group consisting of at least one of canned goods, produce, meats, dairy products, and snacks. The at least one consumer product is beverages selected from a group consisting of at least one of bottled water, fruit juice, vegetable juice, protein shakes, nutritional shakes, pre-packaged coffee, pre-packaged tea, soda pop, carbonated juices; wines, liquor, beer, mixers, and energy drinks. The at least one consumer product is personal items selected from a group consisting of at least one of deodorants, toothpastes, mouthwashes, vitamins, herbal supplements wound dressings, cosmetics, skin moisturizers, sun blocks, anti-itch creams, and sunburn creams. The at least one consumer product is pet care products selected from a group consisting of at least one of domestic animal foods, treats, litter box materials, topical dressings, and specialized diet mixes. The at least one consumer product is clothing selected from a group consisting of at least one of undershirts, undergarments, pants, shoes, coats, information about material from which the clothing is made, coatings on the clothing, and treatments on the clothing. The at least one consumer product is toys for children selected from a group consisting of at least one of mobiles, teething instruments, baby bottles, toys that can fit into a mouth of a child, and pacifiers. The at least one consumer product is lawn care products selected from a group consisting of at least one of fertilizers, pesticides, and moisture-retentive media. The at least one consumer product is window stickers for vehicles selected from a group consisting of at least one of automobiles, commercial vehicles, off-road vehicles, motorcycles, all-terrain vehicles, lawn-mowing equipment, and snow removal equipment. The at least one consumer product is heating, ventilation, and air conditioning products selected from a group consisting of at least one of air conditioning handlers, furnaces, humidifiers, de-humidifiers, swamp-coolers, attic fans, media air cleaners, and electrostatic air cleaners. The at least one consumer product is bedding products selected from a group consisting of at least one of mattresses, box springs, mattress covers, sheets, comforters, duvets, pillows, pillow cases, dust covers, and blankets.

In the many aspects of the present disclosure, at least one of the users is a consumer accessing the ingredient data platform with a mobile device through which the user identifies at least one of the consumer products to obtain a label view containing the portion of the label view with the master attribute descriptive of the one of the consumer products. In the many aspects of the present disclosure, the portion of the label view is configured to provide information to support a SmartLabel® brand view.

In the many aspects of the present disclosure, the mobile device of one of the users is configured to receive QR code data to present the label view that pertains to one of consumer products that are associated with the QR code. In the many aspects of the present disclosure, the mobile device is at least one of a smartphone, a handheld scanner, a kiosk accessible by the consumer, a wearable device, a laptop, a notebook, a tablet, a smartwatch, and a computer.

In the many aspects of the present disclosure, the label view that contains detail of the master attribute is also configured to display at least the master attribute associated with at least one of a reference amount customarily consumed, a predetermined weight per serving, 100 grams of weight per serving, and a recommended daily allowance.

In the many aspects of the present disclosure, the method includes determining that a piece of the constituent information on one of the product labels is incorrect. In the many aspects of the present disclosure, a label portion is generated to provide corrected information for the product labels when it is determined that the piece of the constituent information on one of the product labels is incorrect.

In the many aspects of the present disclosure, a system includes an ingredient data platform that automatically, under computer control, detects items of constituent information from identified product labels for consumer products, that assigns base attributes automatically to all of the items of constituent information on the product labels, and that establishes relationships between the assigned base attributes with different base attributes in pre-constructed taxonomies. The system also assigns a master attribute automatically to at least one of the established relationships, and configures at least one data structure for display in a portion of a label view containing detail of the master attribute that pertains to at least one of the consumer products. The detail of the master attribute contains information unavailable in the constituent information associated with the at least one of the consumer products.

In the many aspects of the present disclosure, the ingredient data platform is configured to be accessed by a user with a mobile device through which the user identifies the at least one of the consumer products to obtain the portion of the label view containing the master attribute descriptive of one the at least one of the consumer products. In the many aspects of the present disclosure, the mobile device is configured to receive QR code data and to present the label view that pertains to the at least one of the consumer products that is associated with the QR code. The mobile device is at least one of a smartphone, a handheld scanner, a kiosk accessible by the consumer, a wearable device, a laptop, a notebook, a tablet, a smartwatch, and a computer.

In the many aspects of the present disclosure, the ingredient data platform captures automatically at least one of text and graphics from the constituent information that includes at least one of nutrition facts, ingredient listings, certification listings, recycling information, warning listings, certification statements, universal product codes, manufacturer's information, and package size.

In the many aspects of the present disclosure, the portion of the label view is configured to provide information to support a SmartLabel® brand view. In the many aspects of the present disclosure, the label view displays at least the master attribute associated with at least one of a reference amount customarily consumed, a predetermined weight per serving, 100 grams of weight per serving, and a recommended daily allowance.

In the many aspects of the present disclosure, the ingredient data platform determines automatically that an item of the constituent information on one of the product labels is incorrect.

In the many aspects of the present disclosure, a label portion is automatically generated to provide corrected information for the product label when it is determined that an item of information is incorrect. In the many aspects of the present disclosure, the ingredient data platform determines automatically that at least one of a nutrition fact, a certification listing, a marketing claim, and a certification statement should be added to the product label.

The many aspects of the present disclosure include a method for automatically deconstructing, analyzing, and confirming information on a plurality of labels using information technology. The plurality of labels is for a plurality of consumer products. The method includes obtaining, using a computing device, a plurality of labels from the plurality of consumer products. Each label of the plurality of labels identifies content of a respective consumer product of the plurality of consumer products. The method includes processing, using the computing device, a label of the plurality of labels to identify constituent information on the label including a first set of claims on the label. The method also includes generating a portion of a label view for display at a client device based on a query about at least the respective consumer product associated with the label including automatically displaying a second set of claims having at least one claim based on the constituent information that is different than any claim in the first set of claims.

In the many aspects of the present disclosure, the second set of claims includes at least one of a confirmation of a legitimacy of at least one claim from the first set of claims. In the many aspects of the present disclosure, the second set of claims includes a suggestion for at least one additional claim. In the many aspects of the present disclosure, the second set of claims includes a suggestion for removal of the at least one claim from the first set of claims. In the many aspects of the present disclosure, the second set of claims deletes at least one claim from the first set of claims. In the many aspects of the present disclosure, the second set of claims substitutes a new claim for the at least one deleted claim.

In the many aspects of the present disclosure, the constituent information is at least one of text and graphics and includes at least one of nutrition facts, ingredient listings, certification listings, recycling information, warning listings, certification statements, universal product codes, manufacturers', marketing claim information, and package size.

In the many aspects of the present disclosure, the obtaining, using a computing device, the plurality of labels from the plurality of consumer products includes capturing each of the labels of the plurality of labels at a scanning device and transmitting the plurality of labels to the computing device.

In the many aspects of the present disclosure, the respective consumer products for which the portion of the label view is generated by the computing device in response to the query is related to at least one item that is selected from a group consisting of at least one of foods; beverages; consumer packaged goods; personal items; pet care products; clothing; toys for children; lawn care products; window stickers for vehicles; heating, ventilation, air conditioning products; and bedding products.

In the many aspects of the present disclosure, the foods are selected from a group consisting of at least one of canned goods, produce, meats, dairy products, and snacks. The beverages are selected from a group consisting of at least one of bottled water, fruit juice, vegetable juice, protein shakes, nutritional shakes, pre-packaged coffee, pre-packaged tea, soda pop, carbonated juices; wines, liquor, beer, mixers, and energy drinks. The personal items are selected from a group consisting of at least one of deodorants, toothpastes, mouthwashes, vitamins, herbal supplements wound dressings, cosmetics, skin moisturizers, sun blocks, anti-itch creams, and sunburn creams. The pet care products are selected from a group consisting of at least one of domestic animal foods, treats, litter box materials, topical dressings, and specialized diet mixes. The clothing is selected from a group consisting of at least one of undershirts, undergarments, pants, shoes, coats, information about material from which the clothing is made, coatings on the clothing, and treatments on the clothing. The toys for children are selected from a group consisting of at least one of mobiles, teething instruments, baby bottles, toys that can fit into a mouth of a child, and pacifiers. The lawn care products are selected from a group consisting of at least one of fertilizers, pesticides, and moisture retentive media. The window stickers for vehicles are selected from a group consisting of at least one of automobiles, commercial vehicles, off-road vehicles, motorcycles, all-terrain vehicles, lawn-mowing equipment, and snow removal equipment. The heating, ventilation, and air conditioning products are selected from a group consisting of at least one of air conditioning handlers, furnaces, humidifiers, de-humidifiers, swamp-coolers, attic fans, media air cleaners, and electrostatic air cleaners. The bedding products are selected from a group consisting of at least one of mattresses, box springs, mattress covers, sheets, comforters, duvets, pillows, pillow cases, dust covers, and blankets.

In the many aspects of the present disclosure, the client device is a mobile device through which a user is able to identify the at least one of the consumer products to obtain the portion of the label view descriptive of at least one of the consumer products.

In the many aspects of the present disclosure, the mobile device is selected from a group consisting of at least one of a smartphone, a handheld scanner, a kiosk by the consumer, a wearable, and a computer.

In the many aspects of the present disclosure, the portion of the label view is configured to provide information related to a SmartLabel® brand label.

In the many aspects of the present disclosure, a portion of the label view is configured to display serving size information. The serving size information is selected from a group consisting of at least one of a reference amount customarily consumed, a user-adjustable weight per serving, 100 grams of weight per serving, and a recommended daily allowance.

In the many aspects of the present disclosure, the client device includes a brand owner interface through which a brand owner is able to generate a portion of a label view for display including the at least one claim in the second set of claims.

In the many aspects of the present disclosure, the client device includes a brand owner interface through which the brand owner is able to generate a portion of a label view that is configured to permit the brand owner to input corrective information to be applied to the portion of the label view for at least the respective consumer product.

DETAILED DESCRIPTION

Detailed aspects of the present disclosure are provided herein; however, it is to be understood that the disclosed aspects are merely examples that may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

The terms "a" or "an," as used herein, are defined as one or more than one. The term "another," as used herein, is defined as at least a second or more. The terms "including" and/or "having," as used herein, are defined as comprising (i.e., open transition).

Figure 2:
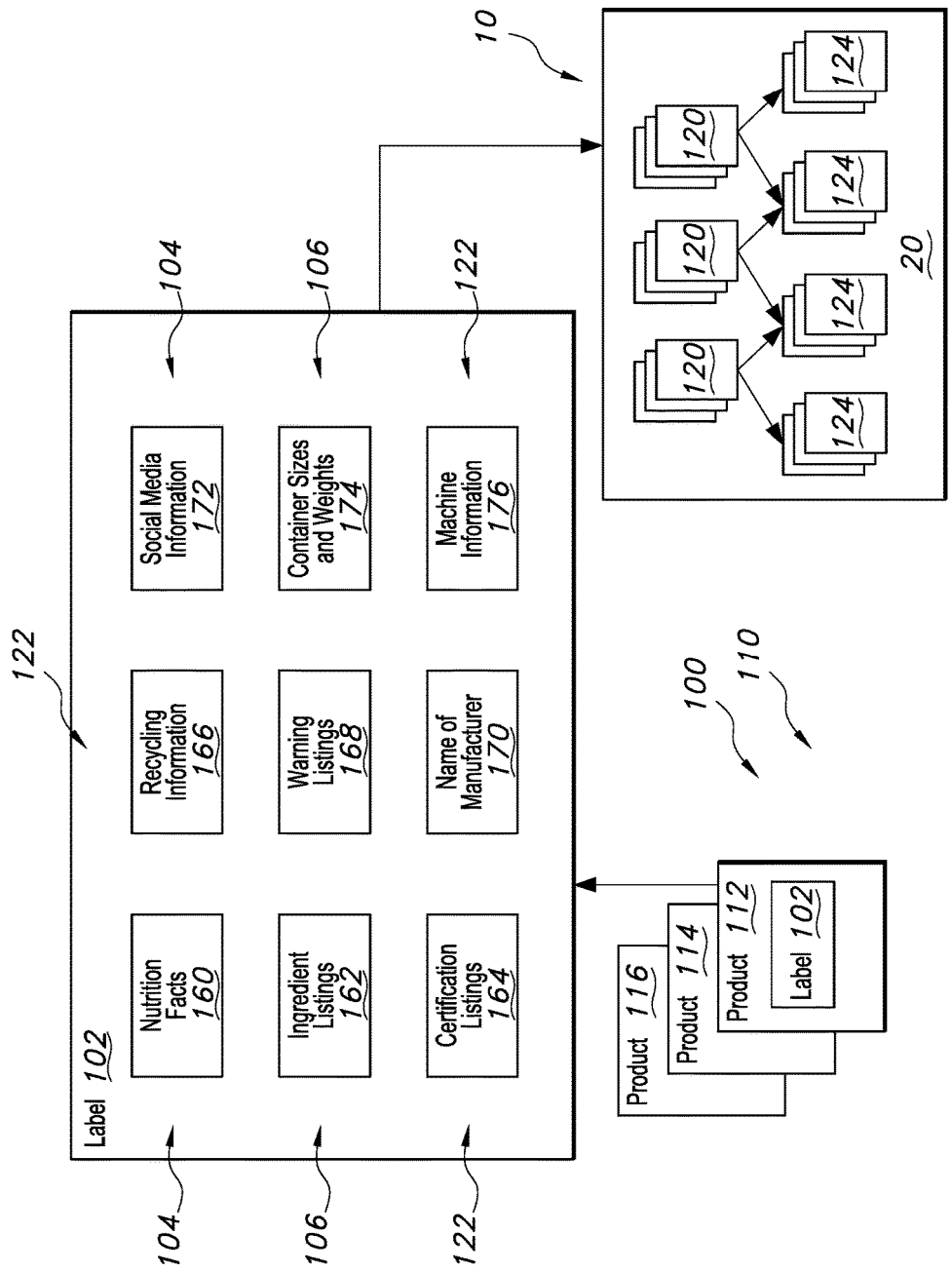
FIG. 2 is a diagram of the ingredient data management platform of the ingredient detection system and its intake of a label of a product into the ingredient data management platform in accordance with the present disclosure.

The many aspects of the present disclosure include an ingredient management computing system and/or computing environment that automatically captures and manages product information typically contained on the labels (referred to in some cases herein as labels or label flats) of food products or other consumer products. In the many aspects, the ingredient management computing system and/or computing environment 10, as depicted in FIGS. 1 and 2, can be used to automatically capture, process, parse, and/or otherwise analyze product information and/or images of product information captured or otherwise obtained from labels of a single product, multiple products (e.g., a very large numbers of products), consumer products, and the like. In the many aspects, the obtained product information is automatically captured, recognized, processed, and parsed by the ingredient management computing system and/or computing environment 10 into data, datasets, or taxonomic data structures of a highly granular level that reflects a base, or atomic, level of each ingredient of which there are many thousands in the aspects of the present disclosure, such that the computing environment, the processes, and the systems described in the present application are required in order to automatically process, analyze, deconstruct, and parse (e.g., breakdown and organize) the vast amounts of ingredient and product data into the pieces or portions of the constituent information in an efficient, instant, and real-time manner, as well as various intermediate levels of the ingredients and product information (such as where an ingredient represents a combination, mixture, compound, or the like). The obtained ingredient and product information can then be processed by the ingredient management computing system and/or computing environment 10 to automatically generate various interfaces and/or graphical user-interfaces (referred to herein as tailored views), which may be provided to users, such as consumers, manufacturers (referred to in some cases herein as brands, brand owners, or product owners), retailers, regulators, marketing professionals, service providers, and others, in real-time or near real-time.

In the many aspects of the present disclosure, the ingredient management computing system and/or computing environment 10 includes an ingredient data management platform 20, as shown in FIG. 1. The ingredient data management platform 20 includes a technology stack of the ingredient management computing system and/or computing environment 10 with various components, modules, and layers that can connect with many different users.

The ingredient data management platform 20 can automatically capture, process, parse, and/or otherwise analyze product ingredients and/or product information from images obtained from one or many labels 100 of one or many products 110 including a single label 102 of a single product 112, and from other single products such as a product 114 and a product 116. In one aspect, text 104 and graphics 106 on the labels 102 can be digitized and deconstructed by the ingredient management computing system and/or computing environment 10 so that many base attributes 120 can be assigned to all or some of constituent information 122 on the labels 100. The base attributes 120 can be categorized, sorted, and mapped to one or more taxonomic libraries that can be in a preconstructed taxonomic data structure. One or more master attributes 124 can be associated with the base attributes 120; or put another way, multiple base attributes 120 can be non-exclusively organized under the master attributes 124. In certain aspects, one of the master attributes 124 can be associated with one of the base attributes 120. In further aspects, one of the master attributes 124 can be associated with a predetermined set of base attributes 120. In additional aspects, one of the master attributes 124 can be associated with the lack of a predetermined set of base attributes 120 being assigned (or in this case, not being able to be assigned) to the constituent ingredients 122 on the labels 100.

The ingredient data management platform 20 can generate tailored views that can be selected by one of the users of the ingredient management computing system and/or computing environment 10. The tailored views (or portions thereof) can display the master attributes 124. The tailored views can also display at least one of the master attributes 124, the constituent information 122, the base attributes 120. In certain examples, the constituent information 122 can include or can be used to recreate the actual text 104 and graphics 106 from the labels 100. The tailored views (or portions thereof) can be used by many users to make decisions about the products 110 with much more information and much more easily understood information relative to what is set forth on typical product labels. As such, the tailored views can display master attributes 124 that are descriptive of products 110 and contain information not found or available from the text 104 and the graphics 106 of the labels 100.

In one example and as shown in label 102, the ingredient management computing system and/or computing environment 10 can be directed to food products, and the label 102 is attached to a consumable product available to the buying public in retail channels, such as on shelves of a store or in an online retail environment. In further examples, the ingredient management computing system and/or computing environment 10 can be directed to personal items with similar labels such as for deodorants, toothpaste, mouthwash, vitamins, herbal supplements, wound dressings, cosmetics, skin moisturizers, sun blocks, anti-itch creams, sunburn creams, and the like. In other examples, the ingredient management computing system and/or computing environment 10 can be directed to pet care products with similar labels such as for domestic animal food, treats, litter box materials, topical dressings, specialized diet mixes, and the like.

In further examples, the ingredient management computing system and/or computing environment 10 can be directed to clothing with similar labels such as for undershirts, undergarments, pants, shoes, coats, and the like, such as to contain, in the various aspects, information about materials, coatings, treatments, or the like, for the same. In other examples, the ingredient management computing system and/or computing environment 10 can be directed to toys for children with similar labels such as for mobiles, teething instruments, baby bottles, toys that can fit into a mouth of a child, pacifiers, and the like. In yet further examples, the ingredient management computing system and/or computing environment 10 can be directed to lawn care products with similar labels such as for fertilizers, pesticides, moisture-retentive media, and the like. In other examples, the ingredient management computing system and/or computing environment 10 can be directed to window stickers for vehicles such as for automobiles, commercial vehicles, off-road vehicles, motorcycles, all-terrain vehicles, lawn-mowing equipment, snow removal equipment, and the like. In further examples, the ingredient management computing system and/or computing environment 10 can be directed to heating, ventilation, and air conditioning products with similar labels such as for air conditioning handlers, furnaces, humidifiers, de-humidifiers, swamp-coolers, attic fans, media air cleaners, electrostatic air cleaners, and the like. Additional examples include the ingredient management computing system and/or computing environment 10 being directed to bedding products with similar labels such as for mattresses, box springs, mattress covers, sheets, comforters, duvets, pillows, pillow cases, dust covers, blankets, and the like.

In the many aspects of the present disclosure, the tailored views can include a view such as a label view (or a portion thereof). The label view can be used for food products or other consumer-directed items discussed herein and can provide more detailed and enhanced labels for the buyer. In the many aspects of the present disclosure, information presented in the tailored view can be used at least in part to create a view that can be used for product verification processes with the manufacturers of the food products, the brand owners, or the like. Information presented in the tailored view through a brand or manufacturer interface can be used at least in part to create another tailored view that can be used to determine compliance with regulatory labeling requirements on food products or the other items discussed herein. Further tailored views can be used to elicit corrective information from the brand owner or manufacturer. Additional tailored views can identify claims that could be added or claims that should be omitted from the labels 100 processed by the ingredient data management platform 20.

In many aspects of the present disclosure, the constituent information 122 can include what is on the package of a product, i.e., every piece of information. In some aspects, the constituent information 122 can be raw data of the product and its labels delivered in an appropriate data stream or through a suitable communication system. In one example, a serving size of thirty grams can be identified as constituent information associated with a food product. By way of this example, the serving size of thirty grams can be considered the raw data from the labeling on the product. The constituent information 122 can be taken verbatim from the labeling but the serving size of thirty grams and other raw data can be split up and organized into its parts. By way of this example, the serving size of thirty grams can be deconstructed and split into two pieces of data: 30 units, and the unit of measure is grams. It will be appreciated in light of the disclosure that the number of units can be varied as can the units of measure. In one example, a single unit could be identified such as one unit and the unit of measure being in liquid ounces, i.e., 1 oz.

In many aspects of the present disclosure, the base attributes 120 can include information derived from the constituent information 122. In many aspects, the base attributes 120 can be the building blocks in the ingredient management computing system and/or computing environment 10. In many examples, the base attributes 120 can be derived from the recognition of information in the constituent information 122 by running recognition processes discussed herein on the constituent information 122. In one example, high fructose corn syrup can be constituent information 122 listed on the labels 100 and can be recognized by the system and/or computing environment 10 and assigned one of many base attributes 120 including "artificial sweetener." In a further example, "HFCS" can be in the constituent information 122 listed on the labels 100 in lieu of the labels saying high fructose corn syrup. HFCS can also be recognized by the ingredient management computing system and/or computing environment 10 and can be assigned one of many base attributes 120 including "artificial sweetener."

In many aspects of the present disclosure, the master attribute 124 can be a "head attribute" under which many of the base attributes 120 can be non-exclusively organized. By way of the previous examples, HFCS can be part of constituent information 122 on one label 100 while High Fructose Corn Syrup can be part of constituent information 122 on another label 100. The base attribute 120 of artificial sweetener can be derived from both the HFCS and the high fructose corn syrup constituent information 122. The base attribute 120 of artificial sweetener can be organized under the master attribute 124 of sweetener. Depending on the use of the master attributes 124, the base attribute 120 of artificial sweetener can be organized under other master attributes 124 such as added sugar, non-sucrose sugars, and the like. In further examples, a master attribute 124 of reduced salt can have base attributes 120 organized under it such as low salt, lower salt, or the like. By way of this example, the constituent information 122 can be a hint of salt, low sodium, or comparable statements detailing a reduction in salt content. In this way, all reduced salt claims can be organized and accessed under the reduced salt master attribute 124 and/or organized under other master attributes 124 that relate to the master attributes where base attributes 120 regarding reduced salt can be helpful such as heart health related master attributes 124.

In many aspects of the present disclosure, the text 104 and the graphics 106 on the labels 100 can be parsed, deconstructed, and digitized so that all of the data on the labels 100 and/or further data associated with the product can be used to identify and save the constituent information 122. The constituent information 122, derived from either the label 100 itself or from other sources, can be stored in a relational database. Various automatic computing methods can be used including machine learning to recognize the patterns in the constituent information 122 stored in the relational database. The base attributes 120 can be automatically derived from the constituent information 122 to pre-process and facilitate the derivation of information from the constituent information 122 for the ultimate organization under and access through the master attributes 124. Once organized under the master attributes 124, any user can access, confirm, or compare any of the constituent information 122 through the relationship with the master attributes 124.

In many aspects of the present disclosure, the constituent information 122 can present additional combinations and patterns of data on which additional master attributes 124 can be created. The creation of the additional master attributes 124 can be performed automatically by the ingredient management computing system and/or computing environment 10. Examples of such additional master attributes 124 can include "Whole Foods Allowed Ingredients," "Basil Ingredients," "Trans Fat Ingredients," "Low Sodium Claims," or the like. The additional combinations and patterns of data recognized in the constituent information 122 can be directed into one or more NoSQL databases or other suitable data stores. In the many aspects of the present disclosure, the ingredient management computing system and/or computing environment 10 can automatically apply many forms of statistical analysis and/or fuzzy logic to automatically and non-exclusively organize the base attributes 120 under one or more master attributes 124 based on the one or more recognized patterns of in the data from the constituent information 122. Any base attributes 120, which are not recognized and as such are not organized under one or more master attributes 124 (or organized under relatively few master attributes 124), can be identified for further analysis that can include automatic and manual forms of analyses. Here, the manual forms of analyses can be learned and later emulated by the ingredient management computing system and/or computing environment 10 when contextual similar base attributes 120 can require further organization or changes to the organizational strategies. As such, the manual inputs to assist in the organization of the base attributes 120 under the master attributes 124 can be deployed later under the automatic processes of the ingredient management computing system and/or computing environment 10.

With reference to FIG. 2, the labels 100 can include many areas of text 104 and many areas of graphics 106, all of this constituent information 122 and anything else on the labels 100 can be automatically processed, parsed, deconstructed, and retained by the ingredient data management platform 20. The automatic processing, parsing, deconstruction, and retention, of the constituent information 122 can be completed by the ingredient data management platform 20 as disclosed herein. The ingredient data management platform 20 can be configured to provide these services resident with the platform 20 or obtain the services hosted in the cloud through connectivity with a cloud network facility or other communication networks.

In the many aspects, the ingredient data management platform 20 can automatically capture, process, parse, and/or otherwise analyze the constituent information 122 on the labels 100 to assign one or more of the base attributes 120 to each piece of the constituent information 122. To make this process more efficient, the ingredient data management platform 20 can automatically parse the constituent information 122 into nutrition facts 160, ingredient listings 162, certification listings 164, recycling information 166, warning listings 168, and the like. The ingredient data management platform 20 can also automatically process and identify further areas on the label 102 such as the name of the manufacturer 170 and its contact and social media information 172. The ingredient data management platform 20 can also automatically process and identify further areas on the label 102 such container sizes or weights 174, universal price code (UPC) or other machine information 176 such as QR codes, batch, serial, and other manufacturing numbers and information.

In the many aspects of the present disclosure, the ingredient data management platform 20 can receive all (or some) of the constituent information 122 on the labels 100 and can automatically process, parse, and/or otherwise analyze all of the text 104 and the graphics 106 of each piece of the constituent information 122 and assign at least one of the base attributes 120 to each of the pieces of constituent information 122. In many instances, more than one of the base attributes 120 can be assigned to each piece of the constituent information 122 for each piece of information found on the labels 100. In one example, one of the base attributes 120 can be assigned when a certain ingredient is detected on the labels 100. Other base attributes 120 can be assigned to other similar ingredients on the labels 100. The base attributes 120 can be used to identify the same ingredients from the constituent information 122 on labels 100 that can be differently described label-to-label, or even within a specific label such as the label 102. One of the labels 100 can list an ingredient that is equivalent to an ingredient listing on another label. In this instance, the ingredient data management platform 20 can assign base attributes 120 to each ingredient and determine a relationship between the base attributes 120 based on the location of the base attributes (and the ingredients or portion thereof to which they are assigned) in the taxonomic data structures, or the like that permit organization of the relationships.

By way of example, a common food coloring often known as Yellow 5 is also known as Tartrazine; however, Yellow 5 can, in fact, be listed on labels of food products, or other purchasable items described herein in many different ways (perhaps hundreds or even over one thousand different ways). The ingredient data management platform 20 can assign one of the base attributes 120 that can indicate the presence of Yellow 5 (i.e., a head ingredient) in the food product when in fact the label contains information showing any one of the many ways to indicate the presence of Yellow 5 but not actually the word "Yellow 5." Thus, the many different ways to say Yellow 5 can be captured as base attributes 120 and associated with the "contains Yellow 5" or "same as Yellow 5" master attributes 124. In this example, "contains Yellow 5" can be one of the master attributes 124 that is applied when any of the thousand ways to indicate Yellow 5 is used on the labels 100. In a further example when the consumer is one of the users and receives one of the tailored views from the ingredient data management platform 20, the consumer can be mindful of an allergy to Yellow 5, but otherwise not be required to be versed in every one of the thousand ways to indicate Yellow 5. Thus, the ingredient data management platform 20 can be constructed to link the many synonyms or near-synonyms in the constituent information 122 to base attributes 120, so that label information (i.e., the constituent information 122 on the labels 100) can be reduced or deconstructed to sets of master attributes 124 that are consistently deployed in the ingredient data management platform 20 and therefore it can be shown that the users can rely on the master attributes 124 to better understand the information on the labels 100.

The many aspects of the present disclosure include the ingredient data management platform 20 having many technology layers 200 that can perform one or more functions and interact with or be part of other layers 200. The ingredient data management platform 20 can obtain all of the text 104 and graphic 106 textual information from the labels 100 including the ingredient listings 162 of the products 110. The ingredient data management platform 20 can also include a new product identification layer 210. The new product identification layer 210 can interact with the products 110 and can accept ingredient information, such as by capturing labels 100 into the ingredient data management platform 20. In the many aspects of the present disclosure, the new product identification layer 210 can interact with an information derivation layer 220 and a claim identification layer 230 (which identifies, for example, marketing claims made on a label) to digitize the labels 100 with the ingredient data management platform 20 and categorize the information from the text 104 and the graphics 106 on the labels 100.

In many aspects of the present disclosure, the new product identification layer 210 can, under computer control, automatically compare the product 110 to an existing dictionary, predetermined references, or the like. The new product identification layer 210 in association with its computing environment can then automatically determine based on metadata associated with the product 110, its brand, its manufacturer, or other associated inputs or contextual information whether this is a new or the same product or the new or same ingredients, certifications, warnings, container information or the like. In some aspects, the new product identification layer 210 can automatically identify new product labels of products that are related to products already learned by (i.e., deconstructed and saved in the libraries and taxonomic structures of) the ingredient data management platform 20 so that features common to the new label and already learned labels need not be learned again in this computing environment. In further aspects, the new product identification layer 210 can also automatically assist in identifying new constituent information 122 on a label that can be described in a different way whether it is ingredients (e.g. HFCS is High Fructose Corn Syrup), product labels, or changes in container labeling or configuration.

In many aspects of the present disclosure, the ingredient data management platform 20 and the computing environment can include the information derivation layer 220 that can automatically analyze patterns on the label 100 of the product 110 to determine its constituent information 122 and assist in the assigning of base attributes 120 in the computing environment. In many aspects of the present disclosure, the claim identification layer 230 can automatically analyze patterns in claims identified in the text 104 and/or graphics 106 of the label 100 to determine with the computing environment the true intent of the identified claims. In one example, a "hint of salt" can be identified in the constituent information 122 and assigned the base attribute 120 that details low sodium.

In further aspects, the ingredient data management platform 20 can have an analytics layer 250 that can associate with the many layers 200 of the ingredient data management platform 20, including a cross-product interaction analysis layer 260 and a market and product positioning analysis layer 270. Each of these layers 250, 260, 270 can interact with other layers 200, including a user data models layer 300 and a database layer 310. The layers 200 can also include a sort layer 320, a compare layer 330, and a search layer 340 to manipulate all (or some) of the master attributes 124, the base attributes 120, and the constituent information 122 based on the product labels 100. In many aspects of the present disclosure, the analytics layer 250 can, among other things, automatically identify all of the constituent information 122 and analyze all of the base attributes 120 and master attributes 124 in the computing environment. In some examples, the analysis of the base attributes 120 and master attributes 124 in the computing environment can result in the automatic suggestions of claims that can be made about (or should be removed from) the product label 100 such as low sodium when such claim can be made or removing low sodium when the circumstances dictate it. In many aspects of the present disclosure, the cross-product interaction analysis layer 260 can automatically use patterns identified by the computing environment in one product, in order to automatically determine similar patterns identified and analyzed in other products. In many aspects of the present disclosure, the market and product positioning analysis layer 270 can automatically determine the context of a product as it relates to other products assigned within its category by the computing environment based on metadata of product. In some examples, the market and product positioning analysis layer 270 can assist the computing environment in automatically suggesting related products for the user. In further examples, the market and product positioning layer 270 can automatically assist the computing environment in automatically identifying constituent information 122 on labels 100 and automatically assigning base attributes 120 based on products positioned in close proximity on a retail shelf offering or offered in a related position with other products in a web-based offering.

In many aspects of the present disclosure, the database layer 310 can be a database of holding pattern information for the computing environment that can be used for matching against constituent information 122 during its automatic identification by the computing environment or its assigning of base attributes 120 or master attributes 124. In many aspects of the present disclosure, the sort layer 320 can provide the computing environment with the ability to slice, sort, re-sort, arrange, and drill-down automatically into different base attributes 120, constituent information 122, and master attributes 124 using derived metadata, contextual information, product positioning, and the like. In many aspects of the present disclosure, the compare layer 330 can provide the computing environment with the ability to compare the base attributes 120, constituent information 122, and master attributes 124 of the products automatically against each other and then re-arranged based on the comparison using derived metadata, contextual information, product positioning, and the like. In many aspects of the present disclosure, the search layer 340 can provide the computing environment with the ability to allow fuzzy searching to gain true intent of search automatically to better compare and view the base attributes 120, constituent information 122, and master attributes 124 of the products 110.

In further aspects, the ingredient data management platform 20 can include a complex definitions layer 350 for determining and cataloging relatively complex text strings in labels 100 that can include, for example, compound ingredient lists with parenthetical statements. An attributes layer 360, or a hybrid attributes layer 370, or both, can interact with the other layers 200 of the ingredient data management platform 20 to determine master attributes 124 based on the base attributes 120 assigned to the constituent information 122 for the products 110 that can be displayed in tailored views. Those tailored views can be based on user profiles or reports, or both. A food ingredients layer 380, or a claims layer 390, or both, can interact with the other layers 200 of the ingredient data management platform 20 to further determine master attributes 124 for the products 110 that can be displayed in tailored views.

In many aspects of the present disclosure, the complex definitions layer 350 can include core definitions for use in the computing environment. The core definitions can include information about relationships between the base attributes 120, the constituent information 122, and the master attributes 124 and specifically when certain base attributes are automatically assigned non-exclusively under one or more master attributes 124. The core definitions that include information about relationships between the base attributes 120, the constituent information 122, and the master attributes 124 can serve as building blocks in the computing environment for the attributes layer 360. The attributes layer 360 can use the building blocks from the computing environment and established by the complex definitions layer 350 to automatically build a wide variety of master attributes 124 based on the profiles of the user, the needs of the brand owners or manufacturers, or entities looking to confirm the correctness of the constituent information 122. The hybrid attributes layer 370 can identify multiple base attributes 120 or master attributes 124 in the computing environment and automatically create additional master attributes 124 with a hybrid of other attributes based on the profiles of the user, the needs of the brand owners or manufacturers, or entities looking to confirm the correctness of the constituent information 122.

In some aspects of the present disclosure, the ingredient data management platform 20 can be a cloud-based platform and can be constructed to deliver the software as a service and to allow access via application programming interfaces (APIs) that are suitable for use by various users or constituencies, such as allowing API-based access between the ingredient data management platform 20 and information technology systems used by manufacturers, retailers, marketers, and the like. In further aspects, the ingredient data management platform 20 can connect to or can include a personalization and recommendation engine 400 and a key messaging engine 410. The ingredient data management platform 20 can also include a data and analytics user interface 420 with a data and analytics API 430. The many users of the ingredient data management platform 20 can connect with an interface or an API, or both, suitable for the needs of that user.

In further aspects of the present disclosure, the ingredient data management platform 20 can include a consumer user interface 450 and a consumer API 460. The consumer user interface 450 can have a personalized recommendations layer 470, a personalized product attribute display layer 480, and a personalized advertising layer 490. The consumer user interface 450 can also have a consumer health and nutrition preference layer 500. The consumer user interface 450 can also connect with a smart food product label landing page layer 510, a smart food product label QR code layer 520, and a digitized smart food product label layer 530. In many aspects of the present disclosure, the personalized product attribute display layer 480 can automatically create a view of the product that can be customized with specific attributes available in the computing environment based on individual user selection. In many aspects of the present disclosure, the smart food product label landing page layer 510 can create an exclusive or custom landing page with "deeper" master attributes 124. The deeper master attributes can be derived automatically from the label 100 based on a smart food product as specified by the SmartSPEC® brand tailored view. The deeper master attributes can be automatically configured by information in the SmartSPEC® brand tailored view. The deeper master attributes can also be automatically configured by information from the user, the brand owner, or the like.

In yet further aspects of the present disclosure, the ingredient data management platform 20 can include a brand user interface 550 and a brand user API 560. In other aspects, the ingredient data management platform 20 can include a retailer user interface 590 and a retailer API 580. The brand user interface 550 and the brand user API 560, the retailer user interface 590, and the retailer API 580, the consumer user interface 450 and consumer user API 460 can connect to a personalization and recommendation engine layer 400. The brand user interface 550 and the consumer user interface 450 can connect to a smart food product label landing page layer 510, a smart food product label QR code layer 520, and a digitized smart food product label layer 530.

In further examples, the retailer user interface 590 can connect with a retailer shelf offerings layer 650. The shelf offering layers 650 can, among other things, locate items in a store on an aisle at a particular shelf location, such as based on the ingredients that may indicate an appropriate aisle (e.g., a "milk" ingredient as one of the major ingredients and a "cheese" statement in a marketing text element might suggest the "dairy" aisle for a product). The retailer user interface 590 can also connect with a retailer stock supply notification layer 660 and a retailer compliance check layer 670 (which may allow compliance personnel or computing resources dedicated to compliance to confirm, using information from the ingredient data management platform 20 that a label and/or the product itself complies with applicable regulations, such as Food and Drug Administration ("FDA") regulations or similar regulations of other jurisdictions). Through various applicable APIs, many different users can connect to the ingredient data management platform 20 that can include additional layers that can be integral with the platform 20 or that are connected to add one or more such services as needed.

The labels 100 for many products 110 from a manufacturer can be received into the ingredient data management platform 20. The text 104 and the graphics 106 can form the nutrition facts 160, ingredient listings 162, certification listings 164, recycling information 166, warning listings 168, etc. on the labels 100 that can all be received into the ingredient data management platform 20. As mentioned in the example above, many base attributes 120 are determined from the constituent information 122 found on the labels 100 and relationships to and with detailed taxonomies that can allow for an understanding of alternative names for ingredients (like Yellow 5). Moreover, the base attributes 120 can be assigned based on how constituent information 122 can roll up into other ingredients that are listed in the ingredients area on the labels 100, e.g., compound ingredients. The base attributes 120 can be assigned to each piece of the product's constituent information 122 and can be used to better understand and validate (or suggest removal of) claims about foods or other products including claims based on ingredients, health claims, and others.

In the many aspects of the present disclosure, the ingredient data management platform 20 can deconstruct all of the information on the labels 100 and can assign base attributes 120 to all of the information. Similar to the Yellow 5 example above, the many different names can be used to indicate added sugar. By way of this example, a multitude of ingredients (from the constituent information 122) can be recognized and assigned base attributes 120 that are sugar and ingredients comparable to sugar. One of the master attributes 124 can be "Added Sugar" and can be associated with the respective consumer products 110 having the labels 100 containing such constituent information 122. The ingredient data management platform 20 can then identify many food products and determine which ones have "Added Sugar" without requiring the user to know the hundreds of different ingredients that can be added to a food product that amounts to "Added Sugar." Just like the Yellow 5 example, a user can inquire about one of the characteristics of a certain food product or many food products and the ingredient data management platform 20 can identify those food products without the user having to be versed in all of the possible sugar contributors or synonyms for Yellow 5.

In the various aspects of the present disclosure, the master attributes 124 can be delivered to the many users through the tailored views. The master attributes 124 can be based on a combination or relationship of the base attributes 120, contextual information of the product, the type of user requesting the information, user profiles, search histories or relevant analytic results, and the like. The types of users can generally include the brand owners or product manufacturers, the retail user that sell products on a retail basis (like packaged food), and the consumer. In other instances, government and regulatory bodies such as the FDA can be a user or any of the one or more regulatory agencies associated with the products. Each of these types of users can have purposefully distinct uses of the ingredient data management platform 20 with specific tailored views.

In accordance with the many aspects of the present disclosure, the ingredient data management platform 20 enables many distinct use cases for manufacturers, retailers, and consumers, among others, including use cases related to marketing research, product development, and compliance with certification processes and government regulators. The use cases can also include product positioning including shelf organization and marketing claims, and advertising placement and review including personalized recommendations for consumers.

In accordance with present disclosure, the ingredient data management platform 20 can provide users with enhanced information relative to what is listed in the text 104 and the graphics 106 on the labels 100. The base attributes 120 can be determined automatically under computer control based on what is in each of the different categories recognized from the text 104 and graphics 106 on the labels 100. In certain instances, the same information in the text 104 and graphics 106, however, can be categorized into at least two categories. Master attributes 124 can then be automatically assigned to each of the products based on the base attributes 120 or the categories in which they are organized, or both. In certain aspects of the present disclosure, one of the master attributes 124 can be based on at least two of the base attributes 120 in two of the different categories.

For the various use cases detailed herein, the ingredient data management platform 20 can receive many requests from the users that can request many different tailored views and include reports listing many master attributes 124. The reports when applicable can also include or be descriptive of base attributes 120 and constituent information 122. In the various aspects of the present disclosure, a subset of master attributes 124 can be selected automatically when the request from one of the users is acknowledged or received. The subset of the master attributes 124 can be based on a combination of the request received from the user and contextual information (such as a history or likes and dislikes of certain products, variants, or brands) associated with the product so that what is delivered can be shown to have an unprecedented level of information helpful to the user relative to the label on the product.

In the various aspects of the present disclosure and with reference to FIGS. 3A, 3B, 3C and 3D, an exemplary version of an ingredient data management platform 700 can similarly receive information from the labels 100 of the products 110. The ingredient data management platform 700 can be another embodiment of the ingredient data management platform 20. The information from the labels 100 can be from a brand owner 710 directly and can be in the form of the label text and graphic images from which the actual box or container art and labels are produced. The labels 100 can also be delivered from retailers 720. From the retailers 720, the labels 100 can be the actual artwork, information, text, etc., that form the product labels. In further examples, the labels 100 can include images taken of the actual labels. The actual labels can be on the product at the time or can be ready to be affixed to the product (i.e., the label flat). The retailer 720, the brand owners 710, and others can use a mobile application 730 to send the images taken of the actual labels. Whether images, actual label art, or a feed of information, the labels 100 can be received into a web upload module 750.

In the various aspects of the present disclosure, the web upload module 750 can communicate with a cloud storage facility module 760, a database module 770, and a thumbnailer module 780. The ingredient data management platform 700 can break down the text 104 and graphics 106 of the labels 100 into the base attributes 120 that can be parsed and stored into many different category modules including an ingredients module 800, a logos module 802, a nutrients module 804, a warnings module 806, and a claims module 808. Certain aspects of the present disclosure include categories, e.g. six categories, in which the base attributes 120 can be classified. In certain aspects, there can a be a rest-of-product module 810 that can serve as a catch-all when certain information does not pertain to the other categories. It will be appreciated in light of the disclosure that the types or number of categories, or both, into which the base attributes 120 can be arranged can vary based on the type of product. While the example above pertains to food, other categories could be implemented when needed such as for non-consumables.

In many aspects of the present disclosure, the web upload module 750 can allow drag and drop functionality to automatically upload labels 100 of products 110 into the ingredient data management platform 20 and the computing environment. Images can be identified, and with drag and drop functionality, can be detected and automatically loaded into the ingredient data management platform 20 and made available in the computing environment. In many aspects of the present disclosure, the database module 770 can house metadata about the images from labels 100 uploaded into the cloud storage module 760. In many aspects of the present disclosure, the thumbnailer module 780 can automatically take high-resolution images and create thumbnail images for better user experience in analytics and API portals in the computing environment.

In many aspects of the present disclosure, the ingredients module 800 can automatically identify, deconstruct, and assist with analyzing all ingredients on the product 110 loaded into the computing environment to identify its constituent information 122. In many aspects of the present disclosure, the logos module 802 can automatically identify and assist with analyzing all logos and certificates (e.g., Kosher, Gluten Free certifications, or the like) to identify such logos in the constituent information 122. In many aspects of the present disclosure, the nutrients module 804 can identify, deconstruct, and analyze nutrients as detailed or outlined by the known Product Nutrient or Supplement facts panel on the label 100 or other nutrients listings in text or graphics to automatically identify such nutrients the constituent information 122. In many aspects of the present disclosure, the warnings module 806 can automatically identify, deconstruct, and assist with analyzing all the constituent information 122 in the computing environment related to allergens and other consumer warnings associated with facilities (e.g., made in a facility that also processes peanuts), contents, combinations with other products, or the like. Allergens identified with the warnings module 806 can also be automatically identified, deconstructed, analyzed and saved or associated with the metadata of the respective consumer products 110. In many aspects of the present disclosure, the claims module 808 can receive unstructured claims data from the computing environment and understand the meaning of the claims in the constituent information 122 by using resources in the computing environment such as pattern recognition, machine learning, keyword identification, or the like to assign appropriate base attributes 120 and master attributes 124. In many aspects of the present disclosure, the rest-of-product module 810 can automatically identify, deconstruct, and assist with analyzing all data on the package not captured by module 800, 802, 804, 806, 808 and make that data available in the computing environment.

In many aspects of the present disclosure, the ingredient recognition engine 900 can take the ingredients automatically captured by the ingredients module 800 and can use the computing environment to parse and recognize patterns to determine and correctly identify ingredients to assign the base attributes 120 and the master attribute 124 accordingly. In many aspects of the present disclosure, the claim recognition engine 902 can take the claims as captured by claims module 808 and can automatically parse and recognize patterns to determine objective claims (such as Hint of Salt means Low Sodium). In many aspects of the present disclosure, the nutrient recognition engine 904 can take the nutrients from the nutrients module 804 and can automatically parse and identify true values of similar constituent ingredients, such as Ascorbic Acid and Vitamin C being the same. In many aspects of the present disclosure, the rest-of-product recognition engine 906 can take the data from the rest-of-product module 810 and can automatically parse, identify, and map relationships between brand and manufacturer and flavor and product size and other data on the label not otherwise processed by the other engines 900, 902, 904.

In many aspects of the present disclosure, the attribution module 950 can take base attributes 120 assigned to the constituent information 122 and use recognition engines to allow for manipulation of what base attributes 120 and master attributes 124 are associated with the various pieces of constituent information. In many aspects of the present disclosure, the indexing module 960 can take the data from a relational database and index it into a NoSQL or document store for faster access and fuzzy searching.

The information on the labels 100 can be received into the ingredient data management platform 700 using imaging scanning and an optical character recognition (OCR) system 820 that can recognize the text 104 or the graphics 106, or both, on the label 100. The graphics on the label can detail certifications or marketing claims such as "Gluten Free," or "Kosher" and those too can be recognized automatically and can be loaded into the ingredient data management platform 700. Each and every piece of information on the labels 100 can be received into the ingredient data management platform 700.

In further aspects of the present disclosure, the ingredient data management platform 700 can use a combination of OCR and graphical image recognition (i.e., one or more recognition and comparison processes). When there is a match between the OCR and graphical image recognition and possibly manual human data entry, the ingredient data management platform 700 can determine that the information is correct with the match and accept it for the label. When there is any mismatch in the entered information, the ingredient data management platform 700 can use this unmatched entered data as a feedback loop, and as such the ingredient data management platform 700 can learn from this feedback loop.

In some aspects of the present disclosure, the feedback loop that indicates the error in matched information can prompt the ingredient data management platform 700 to present the incorrectly matched information from the label 100 to additional computing resources to make an automatic determination or to a data entry person (i.e., a human checker) when appropriate. By way of this example, when the information recognized by the OCR and graphical recognition systems matches entered information from other computing resources; the entry of the information is deemed correct with the match and received by the ingredient data management platform 700. By way of this example, when the information recognized by the OCR and graphical recognition system can match the information entered by other computing resources, then it is deemed a match and received into the ingredient data management platform 700.

With all of the constituent information 122 extracted from the label 100 and the accuracy of its entry confirmed through the matching processes described herein, the ingredient data management platform 700 can begin to associate (or confirm the association) of the base attributes 120 to each piece of the constituent information 122 obtained from the label 100. In the many aspects of the present disclosure and with reference to FIG. 3B, the ingredient data management platform 700 can include an ingredient recognition engine 900, a claim recognition engine 902, a nutrient recognition engine 904, and a rest-of-product recognition engine 906. Each of the engines 900, 902, 904, 906 can deconstruct the information on the labels 100 that pertain to the engine and determine base attributes 120 from that information by identifying the specific ingredients, marketing statements, certifications, and claims.

Further aspects of the present disclosure include deconstructing text 104 of the labels 100 that can include a compound ingredient listing from the ingredient listings. The ingredient recognition engine 900 of the ingredient data management platform 700 can recognize these compound ingredient listings and can deconstruct the compound ingredient listings into individual ingredients. In certain aspects, the base attributes 120 can be automatically assigned to the individual ingredients recognized in the compound ingredient listing and at least one of the base attributes 120 can be associated with each of the individual ingredients from the compound ingredient listing.

In other examples, the compound ingredient listing can include the text of a name of a mixture followed by a parenthetical in the listing containing the individual ingredients. By way of this example, base attributes 120 can be automatically assigned to the individual ingredients recognized in the compound ingredient listing and at least one of the base attributes 120 can be associated with each of the individual ingredients and categorized in the ingredients category. In one example, the compound ingredient listing can be "7 Grain Flour Blend (Flaxseed, Barley, Oats, Spelt, Wheat, Corn, and Rice)." The ingredient recognition engine 900 can determine that the beginning text that announces the mixture (i.e., "7 Grain Flour Bread) can be determined to not be an ingredient and no base attributes would need to be assigned to the 7 Grain Flour Bread beginning text. The individual ingredients listed in the parenthetical (i.e., Flaxseed, Barley, Oats, Spelt, Wheat, Corn, and Rice), however, can have base attributes 120 associated with them by the ingredient recognition engine 900. The beginning text that announces the mixture (i.e., 7 Grain Flour Bread) can be determined to be relevant to the claim category, or other categories besides the ingredient category, and can base attributes associated with those categories.

In further examples, the compound ingredient listing can include an "and/or" statement. By way of this example, base attributes 120 can be automatically assigned to the constituent information 122 recognized in the compound ingredient listing by assuming that all of the individual ingredients are present. In other examples, the retail brand user can confirm portions of ingredients in the compound ingredient listing and base attributes 120 can be associated accordingly with the information from the brand user. In one example, the compound ingredient listing can be "Vegetable Oil (Canola, Cottonseed, and/or Sunflower)." The beginning text that announces the mixture (i.e., "Vegetable Oil") can be determined to not be an ingredient (but an overly broad term for these purposes) and no base attributes need to be assigned to it as an individual oil. Vegetable Oil is nevertheless saved to the ingredients module 800 for consideration of applicability to the other base attributes. In further examples, the beginning text that announces the mixture (i.e., "Vegetable Oil") can also be determined to be an ingredient and one or more of the base attributes 120 can be assigned to it. The individual ingredients listed in the parenthetical with the "and/or" statement, i.e., "Canola, Cottonseed, and/or Sunflower," would have base attributes associated and with them in the ingredients category. The beginning text (i.e., "Vegetable Oil") can be determined to be relevant to the claim category, or other categories besides the ingredient category, and can have the base attributes 120 associated with those categories, such as an example of a presence or a lack of palm oil.

The claim recognition engine 902 of the ingredient data management platform 700 can recognize and parse all of the claims on the labels 100 including those in the text, and those in graphics. The claims can be in reference to the product contained in the container, or to the container itself, for example how it can be recycled. The nutrient recognition engine 904 of the ingredient data management platform 700 can recognize and parse all of the nutrients listed on the labels 100 especially including the information in the nutritional data area of the labels 100. The rest-of-product recognition engine 906 of the ingredient data management platform 700 can recognize and parse all of the other information on the labels 100 including those in the text, and those in graphics. The rest-of-product recognition engine 906 can identify and parse certification statements, UPC codes, manufacturer's information, and the like.

Each of the engines 900, 902, 904, 906 can deconstruct the constituent information 122 on the labels 100 that pertains to the products and assign base attributes 120 to that constituent information 122 by identifying the individual ingredients, marketing statements, certifications, and claims. These engines take the plain information from the label, whether it be text or graphics, or both, and assign base attributes so that the ingredient data management platform 700 is able to recognize every ingredient, claim, certification, or any marking, text, or graphics on the label 100. When the ingredient data management platform 700 is not able to recognize a word, or other text or graphic on the labels 100, the ingredient data management platform 700 can flag the data and require further human input or further computing environment resources to identify it.

In the many aspects of the present disclosure, each of the engines 900, 902, 904, 906 can deconstruct the constituent information 122 on the labels 100 using pre-constructed taxonomies of many different ingredients, nutrients, claims, and other text and graphics found on the labels 100. The taxonomies can link different individual ingredient names by what they are the "same as" providing the ability to search and find products that contain a specific ingredient even though that ingredient may have hundreds or thousands of unique names. Recalling the Yellow 5 examples that have over 1,000 different names, the taxonomies can group all of the "same as Yellow 5" entries together.

In the further aspects of the present disclosure, each of the engines 900, 902, 904, 906 can deconstruct the constituent information 122 on the labels 100 using rules engines to identify the many different ingredients, nutrients, claims, and other text and graphics found on the labels 100. In other aspects of the present disclosure, each of the engines 900, 902, 904, 906 can deconstruct the constituent information 122 on the labels 100 using inverted radix trees to drill down, isolate and ultimately identify all of the constituent information 122 in the form the different ingredients, nutrients, claims, and other text 104 and graphics 106 found on the labels 100.

In the many aspects of the present disclosure, each of the engines 900, 902, 904, 906 after deconstructing the constituent information 122 on the labels 100 and assigning base attributes 120, can move the identified information to the attribution module 950. The attribution module 950 can assign the master attributes 124 to all of the information identified by each of the engines 900, 902, 904, 906 but by specifically referencing the assigned base attributes 120. With reference to FIG. 3C, the master attributes 124 for each of the products can be directed to an indexing module 960 and database module 970 from the attribution module 950. The database module 970 can be an Amazon DynamoDB® brand database service. From the database module 970, the information can be passed to an enterprise search platform 980, such as a SOLR on Apache Lucene™ brand platform. The database module 970 can move information to and from a cache 990, such as cloud front cache.

Figure 3A:
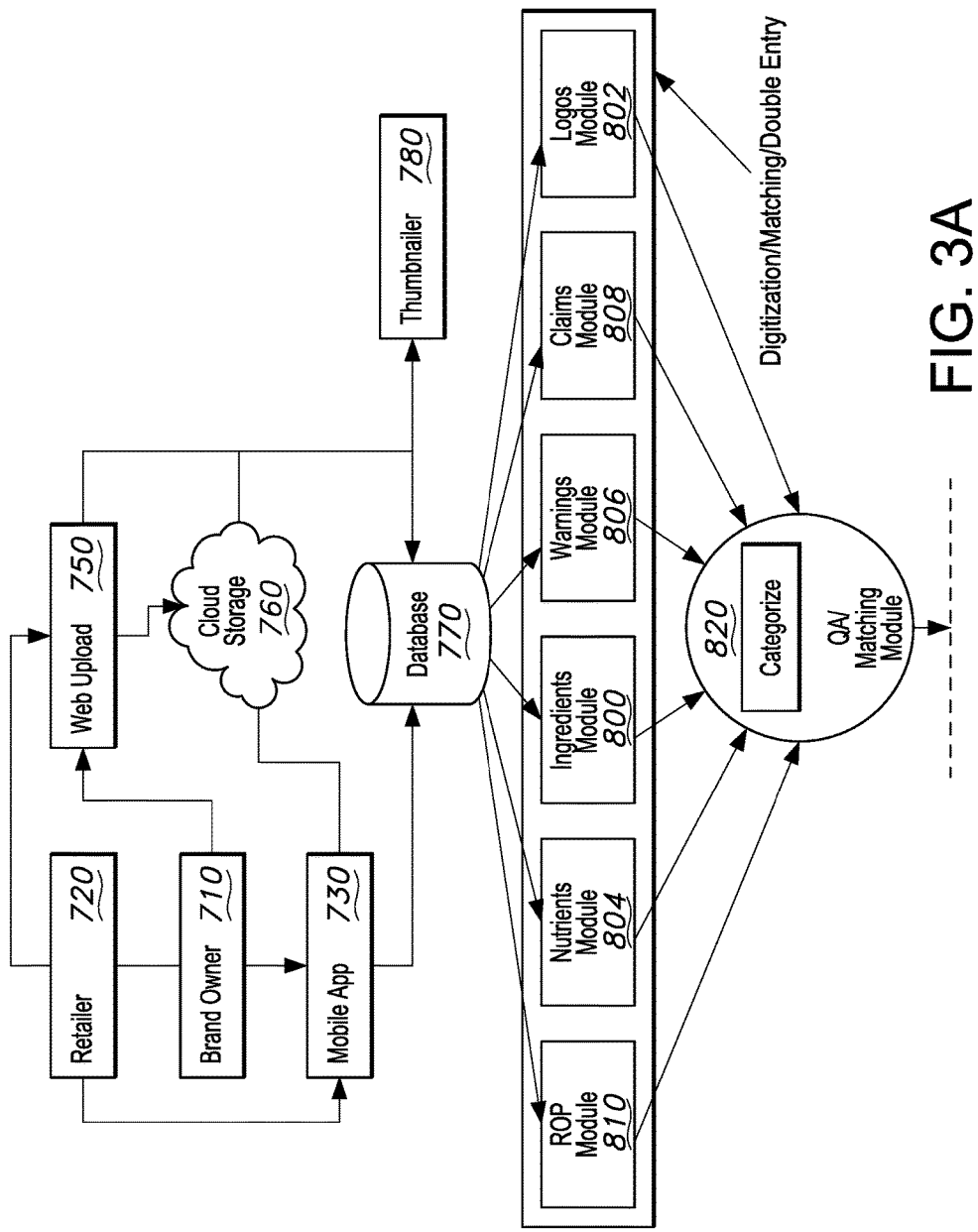
Figure 3D:
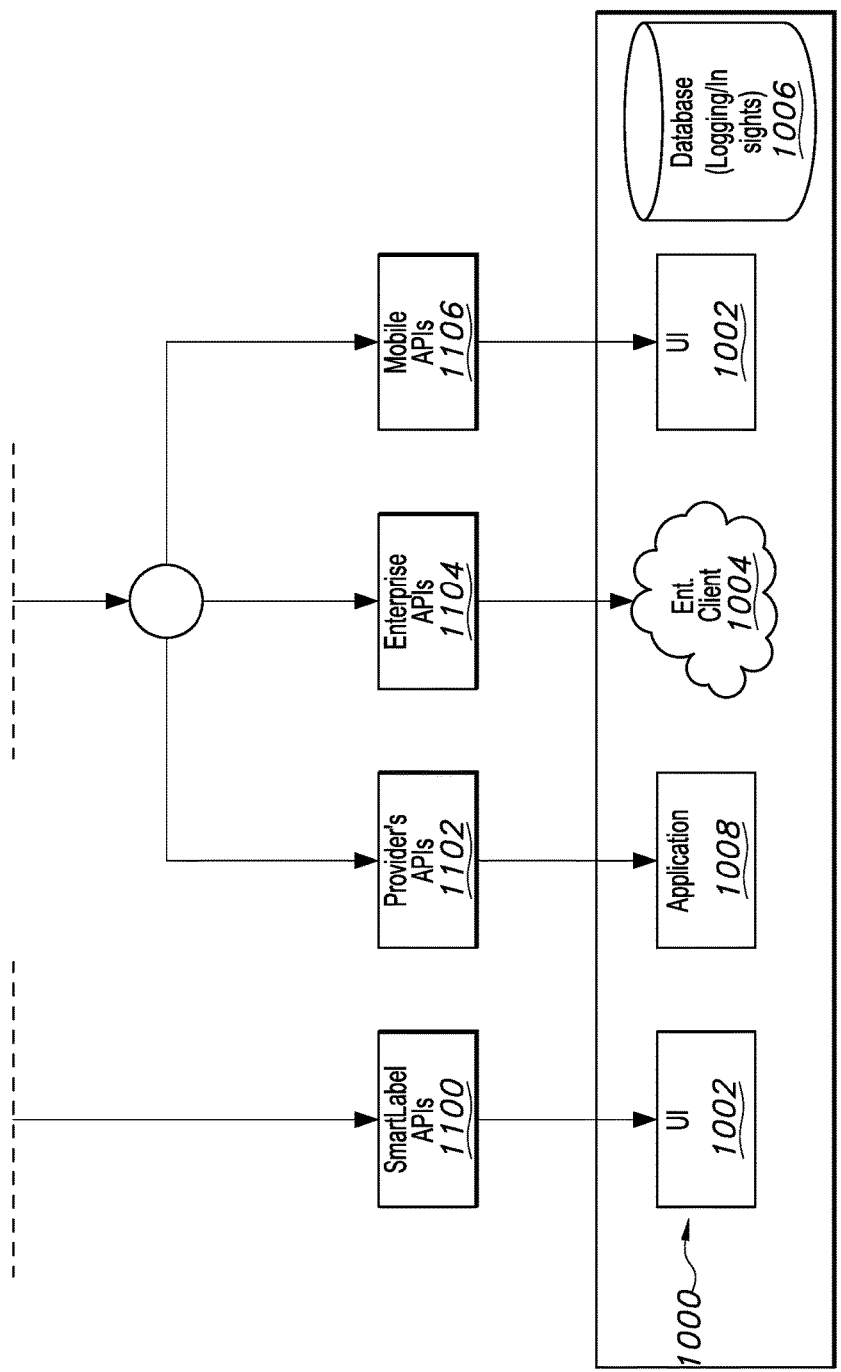

From the database module 970, the cache 990, and the enterprise search platform 980, the information with master attributes 124 assigned and searchable (along with the base attributes 120 and constituent information 122 as needed) can be made available to the many different users through specific user interfaces 1000 and through APIs that can interact with user interfaces or work with other systems, as shown in FIG. 3D. The user interfaces 1000 can include a user interface 1002 on a mobile device, and can also include an enterprise interface 1004 that can be made available or can be resident on a user's computer or private network facilities. The user interface 1000 can also include a database 1006 that can be queried by a user. The user interface 1000 can also include an application 1008 that can be queried by a user remotely or used in a resident or dedicated fashion. In the many aspects of the present disclosure, the APIs can include a SmartLabel® brand API 1100, a provider API 1102, an enterprise API 1104, a mobile API 1106, and the like. The SmartLabel® brand API 1100, the provider API 1102, the enterprise API 1104, and the mobile API 1106 can each be a representational state transfer API. That can rely on a stateless, client-server, cacheable communications protocol. In many aspects, the HTTP protocol or the HTTPS protocol can be used.

The various aspects of the present disclosure can include a custom filter that the ingredient data management platform 700 can use when delivering the subset of master attributes 124 to the user. The user can establish the custom filter so that the same arrangement of master attributes 124, as determined by the user, can be repeatedly delivered to the user in the same format established by the custom filter. The custom filter can serve as a custom specification where users can pre-configure one or more views. For example, the user may be mindful of an allergy or irritant and when viewing products can highlight certain ingredients that might affect the user undesirably.

Moreover, the user can amend the custom filter or specification using the customer user interface. Additionally, the data displayed in the custom filter or specification can be normalized so that different users can compare using the similarly configured filters of specifications. The user can also employ APIs to facilitate the data within third-party applications. Further aspects of the present disclosure can include delivering the subset of the master attributes 124 to the user by presenting the subset in a custom view having a first format based on one of the requests from the user and one of the products. In other aspects, the user can be a brand owner and the presenting of the master attributes 124 includes delivering the custom view having the first format determined through interaction with a brand user interface. The brand user interface can be configured to receive input from the brand user to deliver the custom view changed from the first format to a second format where the second format based on the input from the brand user through the brand user interface.

In accordance with the many aspects of the present disclosure, the brand user interface 550 can use the brand user API 560 to access the ingredient data management platform 20 for detailed information about the ingredients provided by the brand users or manufacturers. To this end, the brand user can connect between its own databases and those of another party with information from the ingredient data management platform 20. In other aspects, the ingredient data management platform 20 can include the retailer user interface 590 and the retailer API 580 that can access the ingredient data management platform 20 for detailed information about the ingredients that the retailer sells, including by direct connection between the retailers' own databases, inventory databases at various retail locations and the ingredient data management platform 20. The consumer API 460 can access the ingredient data management platform 20 for detailed information about the ingredients of interest to the consumer and can coordinate such ingredient data with user applications, other medical programs, exercise programs, or social media applications of the user. The consumer API 460 can also be used to connect with computers in the home and those interfaces available through the retailer and brand owner that can connect with the ingredient data management platform 20 and the interfaces or mobile devices of the consumer to provide the rich ingredient information to various systems directed by the user.

In further aspects, the retailer API 580 can be used to coordinate point of sale transactions to provide the information from the ingredient data management platform 20 to a third-party who can be tracking point of sale transactions for that retailer. The retailer can know not only what is being sold and how it is being sold, but the retailer can also determine many different aspects of the overall sales and drill-down into differing purchases based on the information from the ingredient data management platform 20. Moreover, the consumer APIs 460 can be used to coordinate to confirm purchases at the point of sale, track nutrition, or use the data at the point of the sale and direct or port that data into other user-preferred applications. The brand user APIs 560 can also be used to track and perform analytics on the point of sale transactions to determine many different things including the success of brands in certain geographies, customer demand for certain ingredients, and the like. Every attribute that is associated with each of the products in the ingredient data management platform 20 can be associated with the product at the point of sale and the retailer, the brand owners, the consumer and various third-party tracking and data aggregation entities can track these sales and perform analytics on the associated data. This tracking can, in turn, provide for the selection of items on retailers' shelves that more directed to the buying demands of customers.

When a user identifies products of interest in one or more filters, profiles, or custom specifications, the ingredient data management platform 20 can automatically begin to build a health and nutrition profile based on the detailed understanding of the attributes of that product when associated with the consumer interest. For example, when the consumer shows interest in a sort of high fiber chocolate☐covered muesli bars, the ingredient data management platform 20 can infer that the user is interested in high fiber and this interest can be added to their profile. In a further example, the user can further indicate interest in a preservative free bar or a low-calorie bar, or both, and therefore the ingredient data management platform 20 can add preservative free or low calorie, or both, to their profile.

In yet further aspects of the present disclosure, the user can be a consumer and the consumer can access the ingredient data management platform 20 using the consumer user interface. The consumer user interface can be used to provide a consumer label view that contains more information that the label on the food product to which it relates. The consumer label view can be a SmartLabel® that is viewable through the consumer user interface. The SmartLabel® can conform to the SmartLabel® brand of labels. Additional aspects of the present disclosure include the delivering the subset of the master attributes 124 including presenting the subset in the consumer label view to the consumer through the consumer user interface.

The consumer user interface can be configured to receive QR code data from a mobile device of the consumer and to present the consumer label view that pertains to the QR code on the consumer user interface that is on the mobile device. In some aspects, the consumer label view can contain information not on the label of the food product to which the QR code data pertains.

In other aspects, the consumer user interface can be configured to display the consumer label view that is limited only to the food product to which the QR code pertains. In further aspects, the consumer user interface can be configured to display the consumer label view that details a grouping of food products including the food product to which the QR code pertains. By way of this example, the user can search for a food product with the QR code and receive a SmartLabel® brand label or consumer label view through the consumer user interface.

In yet further aspects of the present disclosure, the consumer user interface can be configured to highlight to the user the food product to which the QR code pertains relative to other food products in a grouping of food products all of which can be related to the food product initially identified with the QR code. By way of this example, the user can search for a food product with the QR code and receive the SmartLabel® brand label or consumer label view through the consumer user interface that compares many related food products relative to the food product identified by the QR code. In certain aspects, QR code data can be received from the mobile device that contains at least two food products. The consumer user interface can be configured to display the consumer label view that details a grouping of food products including the at least two food products that pertain to the received QR code data. In the various aspects of the present disclosure, the mobile device can be a smartphone, a handheld scanner, a kiosk by the consumer, and a portable computer and the consumer user interface can be on the mobile device.

The SmartLabel® brand label can include several sections including the Nutrition Facts Panel, Ingredients, Allergens, Marketing Claims, Health & Safety, GMO Disclosure, Product Instructions, Sustainability, and Brand/Company. Several of the sections listed in the SmartLabel® brand label are verbatim from the package, such as the Nutrition Facts Panel and Product Instructions sections, while others can require analysis, taxonomy based recognition and off package data generation.

In one example, the SmartLabel® brand label ingredient section can require that all ingredients be individually parsed and for their parenthetical relationships to be displayed in a hierarchical fashion. The systems and methods disclosed herein can make this task relatively easy, as each ingredient can be parsed out individually while maintaining its order and parenthetical relationship to the other ingredients located within the ingredient declaration.

In further examples, the SmartLabel® brand label allergen section can highlight the containment level of the 8 FALCPA allergens based on ingredient declarations and allergen warning statements. Using the systems and methods disclosed herein, the ingredients can be parsed and each ingredient can be assigned FALCPA allergen properties for the three main containment levels—Contains, May Contain and Does Not Contain. This results in an analysis that can be used to determine the FALCPA allergen containment level of each ingredient associated to an individual product based purely on the ingredient declaration. The systems and methods disclosed herein further make it possible to determine more specific containment levels such as Facility Free, Shared Facility and Shared Equipment based only on the allergen warning statement. This result in a comprehensive allergen analysis that can be shown to allow for easy identification of the six FALCPA allergen containment levels required as part of the SmartLabel® brand label specification.

In an additional example, the SmartLabel® brand label marketing claims section can use a mixture of verbatim claims generated directly from the package, off package claims and derived claims from other data points available on the package. The off package and derived claims can be shown to be some of the most valuable pieces of information, as they can add additional information and marketing ability from what is on the package due to limited real estate on the packaging. The systems and methods disclosed herein can provide unique derived claims that can be created based on using additional data points from the label. The derived attributes can offer manufacturers' a variety of options when implementing the SmartLabel® brand label including an FDA Nutrient Content Claim that utilizes nutrient analysis per serving, per Reference Amounts Customarily Consumed (RACC), per 100 and main/meal/individual category analysis, or an ingredient absence statement that relies on attributes already determined by the disclosed systems and methods. In other aspects of the present disclosure, the ingredient data management platform 700 can host at least two users and each of the users being a consumer engaged to the ingredient data management platform 700 through the consumer user interface. The first consumer and the second consumer each have a mobile device with the consumer user interface. In various aspects, the consumer user interface of the first consumer creates a first profile based on requests from the first consumer. The consumer user interface of the second consumer creates a second profile based on requests from the second consumer.

In further aspects of the present disclosure, the selecting of the subset of the master attributes 124 automatically can include selecting a first subset of the master attributes 124 automatically when a first request is acknowledged from the first consumer and selecting a second subset of master attributes 124 automatically when a request is acknowledged from the second consumer. An example of a first subset of master attributes 124 can be three attributes: no Yellow 5, no sugar, and gluten free. The first subset of the master attributes 124 is based on a combination of the request received from the first consumer, the contextual information associated with the product, and the first profile. The second subset of the master attributes 124 is based on a combination of the request received from the second consumer, the contextual information associated with the product, and the second profile.

Differences between the first profile and the second profile increase with more requests from the first user or the second user, or both. The profiles of each of the users can develop to a point where the first consumer can view a certain food product using their profile in the consumer user interface and what they see would be very different, and in some instances, drastically different then what the second consumer can view through their profile in the consumer user interface of the same food product.

In certain aspects of the present disclosure, the ingredient data management platform 20, 700 can associate all of the constituent information 122 obtained from the label of a food product with food codes recognized by the National Health and Nutrition Examination Survey based on the base attributes determined from the label. The National Health and Nutrition Examination Survey (NHANES) is a survey research program conducted by the National Center for Health Statistics (NCHS) to assess the health and nutritional status of adults and children in the United States and to track changes over time. These NHANES food codes can be shown to aide in food-mapping to determine specific food compositions. In certain aspects of the present disclosure, the NHANES food codes can also be shown to serve as a reference value to drive a unified global approach and global standard giving the ability to classify every ingredient associated with the food product based on the NHANES food codes. In additional aspects of the present disclosure, the automatic assigning master attributes 124 to each of the food products is based on the base attributes 120 and includes applying food codes recognized by the National Health and Nutrition Examination Survey to the product based on the base attributes 120 from the ingredients category.

In certain aspects of the present disclosure, the ingredient data management platform 20, 700 can display the information from the labels 100 with reference to a reference amount customarily consumed (RACC). In this example, the user can be a consumer and ingredients obtained from the label can be displayed to the user with the RACC amounts even when the label lacks on RACC information. In further examples, the consumer user interface can be configured to display the ingredients with reference to a predetermined weight per serving. In one example, the predetermined weight per serving can be 100 grams. In further examples, the consumer user interface can be configured to display the ingredients with reference to a recommended daily allowance.

In many aspects of the present disclosure, the brand owner can review and confirm the correctness of all master attributes 124, base attributes 120, constituent information 122, and other information from each of its products for which labels 100 have been accepted into the ingredient data management platform 700. In further aspects, the brand owners can add additional detail to or verify, or both, the information from their products through the brand owner interface. The brand owner can indicate the country of origin of the product and for each individual ingredient. The brand owner can further indicate at which, manufacturing facility the product is made and from where portions of ingredients have been sourced. The added information from the brand owner can be communicated to the retail user through the retail user interface and to the consumer through the consumer interface.

In many aspects of the present disclosure, the brand owner can use the brand user interface to display master attributes 124 associated with the food product as selected by the brand owner to confirm and verify whether the food product is complaint with a regulatory or certification authority. The master attributes 124 can be applied by the ingredient data management platform 20 and the brand owner can be notified that claims on the labels 100 of the product are correct, or in some instances, they may not be correct and can be altered. The brand user interface can also be configured to display master attributes 124 associated with the products as selected by the brand owner to confirm whether the food product is a candidate for a certification or a claim not already otherwise associated with the product. As such, the ingredient data management platform 20 can identify for the brand owner one or more certifications and or claims that could be applied but are not yet on the labels 100.

In many aspects of the present disclosure, the brand owner, or retailers, or both, can use the brand user interface, retailer interface, or a mobile application to conduct compliance checks of their products before the Food and Drug Administration (FDA). The information in the ingredient data management platform 20, 700 when related to food can be confirmed and verified by the FDA as a compliance check with FDA mandates for recalls, banned ingredients, FDA approvals, and the like.

In many aspects of the present disclosure, the consumer can use the consumer user interface to explore the product base and all master attributes 124, base attributes 120, and the constituent information 122 in the ingredient data management platform 20, 700. As such, the user can start a search based on a single ingredient. The user interface can apply various analytics that allows exploration of product categories at different levels, such as based on ingredients and claims. For example, information from the ingredient data management platform 20 can reveal that one in five snacks, energy or granola bars in the US now makes a non-GMO claim of some kind. It can be shown that this food category that includes snacks, energy or granola bars is the leading category for non-GMO claims, compared with an average of 4.2% for all the grocery products in its database.

In many aspects of the present disclosure, an image capturing computing system 1200 can perform the methods and processes discussed in the present application and depicted in FIG. 4. The image capturing computing system 1200 can include an image capture device 1210 that can functionally communicate with a processing unit 1220 of a computing device 1222 directly, or over a communications network 1230, which may be an IP-based telecommunications network, the Internet, an intranet, a local area network, a wireless local network, a content distribution network, or any other type of communications network, as well as combinations of networks.

The image capture device 1210 can be employed to automatically capture product information from a product or consumable good, such as an image of a product label located on a portion of a product or consumable good, such as the label 100 (FIG. 2). In many aspects of the present disclosure, metadata identifying portions of the product label as graphic or text may be encapsulated or otherwise embedded within the captured image. Although FIG. 4 only includes a single device, it is contemplated that there may be multiple image capture devices 1210 (e.g., remotely located, or scalable through a cloud network facility) that automatically capture product information including product labels of products and/or consumable goods.

Each image capture device 1210 can include a scanner component 1212 that can function to obtain product information from a product or consumable good. Stated differently, the scanner component 1212 can optically scan some portion of a product, such as the label 100, and output image data corresponding to the scanned portion of the product. In one specific example, the scanner 1212 may optically scan a barcode label or other machine-readable components of the label that can be provided on consumer products.

The image capture device 1210 can automatically transmit the product information (e.g., scanned image data) and any associated metadata to the image processing unit 1220 for processing and parsing. In some aspects, the product information may have been previously captured and stored in a database for later retrieval and processing by the computing device 1222, such as from the product information 1232, 1234, 1236, 1238.

The processing unit 1220 may employ various optical character recognition (OCR) programs to process, deconstruct, and parse the product information and/or product image data, which generates text strings from alphanumeric label information and generates graphics maps/images from graphics and/or logos included in the image data of the product labels. The text and/or graphics data may be compared to various text and graphics data in a database to return information relative to the scanned text string(s)/graphic(s). In many aspects, the image processing unit 1220 can automatically parse the product labels to determine or otherwise identify every piece of constituent information 122 on the labels 100 and assign one or more base attributes 120 to each piece of constituent information 122 for each product, particularly including all text and graphics on the label.

In many aspects, the computing device 1222 may automatically catalog and index or otherwise store the constituent information 122 and the base attributes 120 in a database 1240. Although the database 1240 is depicted as being located within the computing device 1222, it will be appreciated in light of the disclosure that the database 1240 can be located external to the computing device 1222, such as at a remote location or through a cloud network facility that can be connected to the computing device 1222 through the communications network 1230.

Figure 5:
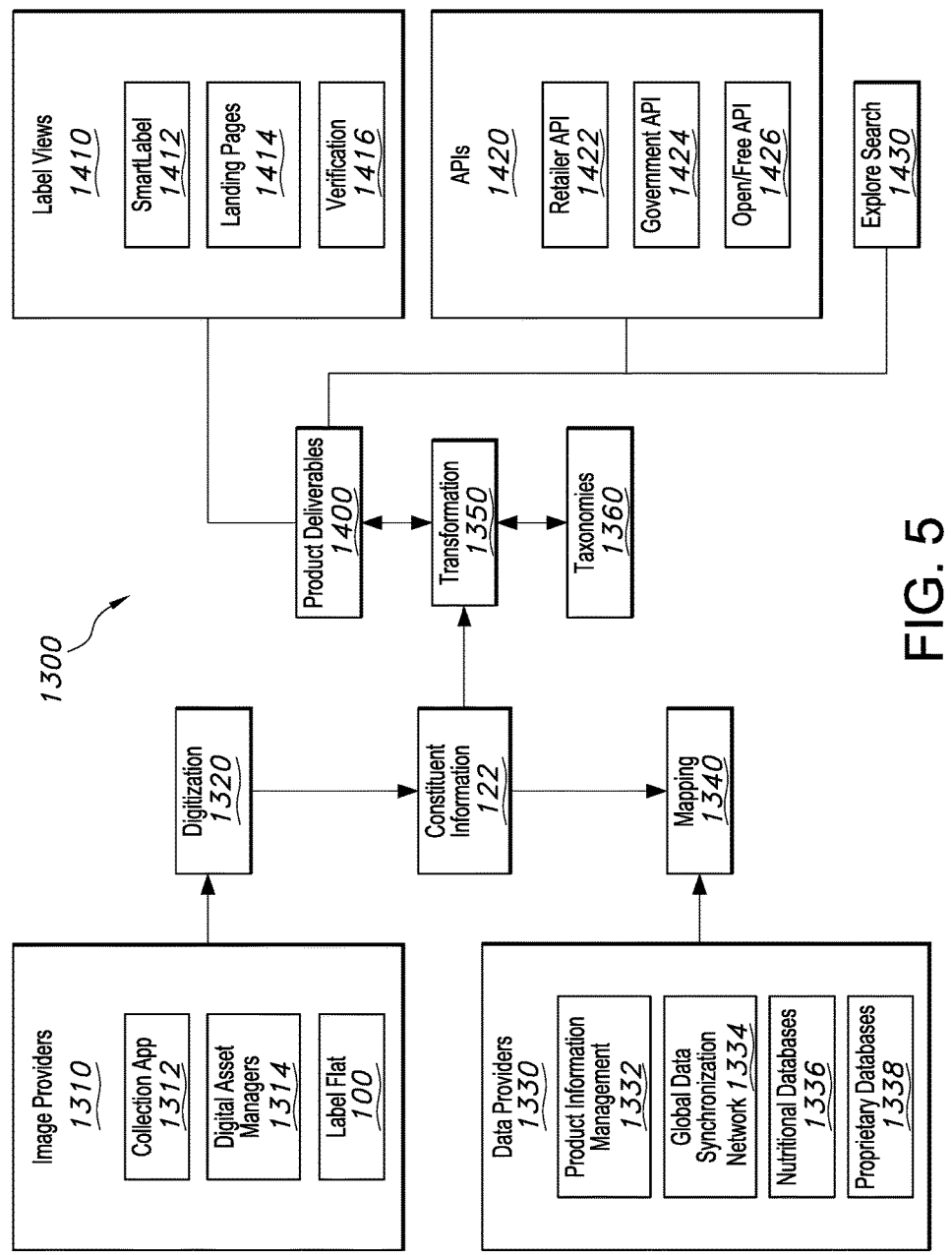
FIG. 5 is a diagram of an exemplary technology stack for obtaining constituent information and providing master attributes and additional information to views, APIs, and search systems in accordance with the present disclosure.

In many aspects of the present disclosure, an exemplary technology stack 1300 can be associated with the ingredient data management platform 20, as depicted in FIG. 5. The technology stack 1300 can be an embodiment of the technology stack in the ingredient data management platform 20. The technology stack 1300 can obtain constituent information 122 and provide master attributes 124 and additional information to views, APIs, and search systems in accordance with the present disclosure. The technology stack 1300 can connect to image providers 1310. The image providers 1310 can provide the text 104 and graphics 106 directly from the labels 100. The image providers 1310 can include a collection app 1312 and digital asset managers 1314 from which constituent information 122 can be exchanged or downloaded. The image providers 1310 can also include the labels 100 from which the constituent information 122 can be obtained. Information from the image providers 1310 can be digitized at 1320. The technology stack 1300 can also connect to data providers 1330. The data providers 1330 can provide the information relevant to each consumer products directly to the ingredient data management platform 20. The data providers 1330 can include information obtained from product information management 1332, the global data synchronization network 1334, one or more nutritional databases 1336, and one or more proprietary databases 1338. Information from the data providers 1330 can be mapped at 1340.

From digitalization at 1320 and mapping at 1340, the information from the image providers 1310 and the data providers 1330 can be transformed at 1350. The transforming at 1350 can include the assignment of the base attributes 120 and their organization under the master attributes 124. The transforming at 1350 can include accessing taxonomies at 1360 in the assignment of the base attributes 120. The transforming at 1350 provides content for label views, APIs, and for search facilities as product deliverables at 1400. As such, the product deliverables 1400 can support label views 1410 (i.e., tailored views) including SmartLabel® pages 1412, landing pages 1414, verification pages 1416, and the like. The product deliverables 1400 can also support APIs 1420 including retailer APIs 1422, government APIs 1424, open/free APIs 1426, and the like. The product deliverables 1400 can also support information for an explorer search 1430 so that any user can perform many different search functions on the information from the ingredient data management platform 20.

While various aspects of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In various aspects of the present disclosure, the processor may be part of a server, cloud server, client, network infrastructure, mobile computing platform, stationary computing platform, or other computing platforms. A processor may be any kind of computational or processing device capable of executing program instructions, codes, binary instructions, and the like. The processor may be or may include a signal processor, digital processor, embedded processor, microprocessor, or any variant such as a co-processor (math co-processor, graphic co-processor, communication co-processor and the like) and the like that may directly or indirectly facilitate execution of program code or program instructions stored thereon.

In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions, and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In certain aspects, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server, and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client, and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications networks. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another.

The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, and the like. Furthermore, the elements depicted in the flowchart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with certain aspects of the present disclosure shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein is merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure, and does not pose a limitation on the scope of the disclosure unless otherwise claimed. No language in the specification should be construed as indicating any non-claimed element as essential to the practice of the disclosure.

While the foregoing written description enables one skilled in the art to make and use what is considered presently to be the best mode thereof, those skilled in the art will understand and appreciate the existence of variations, combinations, and equivalents of the specific aspects, method, and examples herein. The disclosure should therefore not be limited by the above-described aspects, methods, and examples, but by all disclosure within the scope and spirit of the disclosure.

What is claimed is:

1. A method for automatically deconstructing, analyzing, and confirming information on a plurality of labels, the plurality of labels being for a plurality of consumer products, the method comprising:

receiving at least one image of each label of the plurality of labels from an image capture device, the image capture device communicating the at least one image to a computing device;

processing and parsing, using the computing device, text and graphics from the at least one image of each label of the plurality of labels from the plurality of consumer products to identify constituent information, each label of the plurality of labels identifying content of a respective consumer product of the plurality of consumer products;

processing and parsing, using the computing device, a label of the plurality of labels to identify a first set of claims on the label found in the constituent information; and generating a user interface including a portion of a label view for display at a client device based on a query about at least the respective consumer product associated with the label, including automatically displaying in real-time in the portion of the label view at least a portion of the constituent information and a second set of claims having at least one new claim based on the constituent information that is different than any claim in the first set of claims and that is not set forth in the text and graphics.

2. The method of claim 1 wherein the second set of claims includes at least one of a confirmation of a legitimacy of at least one claim from the first set of claims.

3. The method of claim 1 wherein the second set of claims includes a suggestion for at least one additional claim.

4. The method of claim 1 wherein the second set of claims includes a suggestion for removal of the at least one claim from the first set of claims.

5. The method of claim 1, wherein the second set of claims deletes at least one claim from the first set of claims and removes the at least one claim from the first set of claims from the user interface including the portion of the label view.

6. The method of claim 5, wherein the second set of claims substitutes a new claim for the at least one deleted claim.

7. The method of claim 1 wherein the constituent information is at least one of text and graphics and includes at least one of nutrition facts, ingredient listings, certification listings, recycling information, warning listings, certification statements, universal product codes, manufacturers information, marketing claim information, and package size.

8. The method of claim 1 wherein the obtaining, using a computing device, the plurality of labels from the plurality of consumer products includes capturing each of the labels of the plurality of labels at a scanning device and transmitting the plurality of labels to the computing device.

9. The method of claim 1 wherein the portion of the label view is generated by the computing device in response to the query is related to at least one item that is selected from a group consisting of at least one of foods; beverages; consumer packaged goods; personal items; pet care products; clothing; toys for children; lawn care products; window stickers for vehicles; heating, ventilation, air conditioning products; and bedding products.

10. The method of claim 9 wherein the foods are selected from a group consisting of at least one of canned goods, produce, meats, dairy products, and snacks; wherein the beverages are selected from a group consisting of at least one of bottled water, fruit juice, vegetable juice, protein shakes, nutritional shakes, pre-packaged coffee, pre-packaged tea, soda pop, carbonated juices; wines, liquor, beer, mixers, and energy drinks; wherein the personal items are selected from a group consisting of at least one of deodorants, toothpastes, mouthwashes, vitamins, herbal supplements wound dressings, cosmetics, skin moisturizers, sun blocks, anti-itch creams, and sunburn creams; wherein the pet care products are selected from a group consisting of at least one of domestic animal foods, treats, litter box materials, topical dressings, and specialized diet mixes; wherein the clothing is selected from a group consisting of at least one of undershirts, undergarments, pants, shoes, coats, information about material from which the clothing is made, coatings on the clothing, and treatments on the clothing; wherein the toys for children are selected from a group consisting of at least one of mobiles, teething instruments, baby bottles, toys that can fit into a mouth of child, and pacifiers; wherein the lawn care products are selected from a group consisting of at least one of fertilizers, pesticides, and moisture retentive media; wherein the window stickers for vehicles are selected from a group consisting of at least one of automobiles, commercial vehicles, off-road vehicles, motorcycles, all-terrain vehicles, lawn-mowing equipment, and snow removal equipment; wherein the heating, ventilation, and air conditioning products are selected from a group consisting of at least one of air conditioning handlers, furnaces, humidifiers, dehumidifiers, swamp-coolers, attic fans, media air cleaners, and electrostatic air cleaners; and wherein the bedding products are selected from a group consisting of at least one of mattresses, box springs, mattress covers, sheets, comforters, duvets, pillows, pillow cases, dust covers, and blankets.

11. The method of claim 1 wherein the client device is a mobile device through which a user is able to identify the at least one of the consumer products to obtain the portion of the label view descriptive of at least one of the consumer products.

12. The method of claim 11 wherein the mobile device is selected from a group consisting of at least one of a smartphone, a handheld scanner, a kiosk by the consumer, a wearable, a smartwatch, and a computer.

13. The method of claim 1 wherein the portion of the label view is configured to provide information related to a brand label having QR data.

14. The method of claim 1 wherein a portion of the label view is configured to display serving size information, and wherein the serving size information is selected from a group consisting of at least one of a reference amount customarily consumed, a user-adjustable weight per serving, 100 grams of weight per serving, and a recommended daily allowance.

15. The method of claim 1 wherein the client device includes a brand owner interface through which a brand owner is able to generate a portion of a label view for display including the at least one claim in the second set of claims.

16. The method of claim 1 wherein the client device includes a brand owner interface through which a brand owner is able to generate a portion of a label view that is configured to permit the brand owner to input corrective information to be applied to the portion of the label view for at least the respective consumer products.

17. A method for automatically deconstructing, analyzing, and confirming information on a plurality of labels, the plurality of labels being for a plurality of consumer products, the method comprising:

receiving at least one image of each label of the plurality of labels from an image capture device, the image capture device communicating the at least one image to a computing device;

processing and parsing, using the computing device, text and graphics from the at least one image of each label of the plurality of labels from the plurality of consumer products to identify constituent information, each label of the plurality of labels identifying content of a respective consumer product of the plurality of consumer products;

processing and parsing, using the computing device, a label of the plurality of labels to identify a first set of claims on the label found in the constituent information; and generating a user interface including a portion of a label view for display at a client device based on a query about at least the respective consumer product associated with the label, including automatically displaying in real-time in the portion of the label view at least a portion of the constituent information and a second set of claims having at least one claim that deletes at least one claim from the first set of claims and removes the at least one claim from the first set of claims from the user interface including the portion of the label view.

18. The method of claim 17 wherein the second set of claims includes at least one of a confirmation of a legitimacy of at least one claim from the first set of claims, a suggestion for at least one additional claim, a suggestion for removal of the at least one claim from the first set of claims, and a substitute for a new claim for the at least one deleted claim.

19. The method of claim 17 wherein the client device is a mobile device through which a user is able to identify the at least one of the consumer products to obtain the portion of the label view descriptive of at least one of the consumer products, and wherein the mobile device is selected from a group consisting of at least one of a smartphone, a handheld scanner, a kiosk by the consumer, a wearable, a smartwatch, and a computer.

20. The method of claim 17 wherein the client device includes a brand owner interface through which a brand owner is able to generate a portion of a label view that is configured to permit the brand owner to input corrective information to be applied to the portion of the label view for at least the respective consumer products.

* * * * *